US012763872B2

(12) United States Patent
Zhang et al.

(10) Patent No.: US 12,763,872 B2
(45) Date of Patent: Oct. 13, 2026

(54) EARLY TERMINATION FOR OUTER CODING IN ACCORDANCE WITH USER EQUIPMENT FEEDBACK

(71) Applicant: QUALCOMM Incorporated, San Diego, CA (US)

(72) Inventors: Qian Zhang, Basking Ridge, NJ (US); Jelena Damnjanovic, Del Mar, CA (US); Hyun Yong Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 329 days.

(21) Appl. No.: 18/422,682

(22) Filed: Jan. 25, 2024

(65) Prior Publication Data

US 2025/0247165 A1 Jul. 31, 2025

(51) Int. Cl.
*H04L 1/00* (2006.01)
*H04L 1/08* (2006.01)
(Continued)

(52) U.S. Cl.
CPC .............. *H04L 1/0014* (2013.01); *H04L 1/08* (2013.01); *H04W 72/21* (2023.01); *H04W 80/02* (2013.01)

(58) Field of Classification Search
CPC ....... H04L 1/0014; H04L 1/08; H04L 1/1819; H04L 1/0057; H04W 72/21; H04W 80/02
See application file for complete search history.

(56) References Cited

U.S. PATENT DOCUMENTS

2005/0169205 A1* 8/2005 Grilli ................ H03M 13/2703 370/313
2021/0226732 A1* 7/2021 Yeo ........................... H04L 1/18
(Continued)

FOREIGN PATENT DOCUMENTS

WO 2017035727 A1 3/2017
WO WO-2021023070 A1 * 2/2021 ........... H04L 1/1816
WO WO-2021238665 A1 * 12/2021 ........... H04L 1/0065

OTHER PUBLICATIONS

International Search Report and Written Opinion—PCT/US2024/060298—ISA/EPO—Mar. 28, 2025.
(Continued)

*Primary Examiner* — Farid Seyedvosoghi
(74) *Attorney, Agent, or Firm* — Harrity & Harrity LLP

(57) ABSTRACT

Various aspects of the present disclosure generally relate to wireless communication, and to early termination for outer coding (OC) in accordance with user equipment (UE) feedback. For example, a network node may generate an OC block corresponding to a PDU set to be transmitted to a UE, where the OC block includes K source symbols (or original packets) and one or more parity symbols (or redundant packets) generated from the K source symbols. The network node may then generate and transmit encoded packets that carry the source symbols and the parity symbols to the UE. Accordingly, because a recovery probability for the PDU set is very high after the UE receives a quantity of symbols equaling or exceeding K, the UE may transmit, to the network node, feedback including an indication to terminate transmission of the parity symbols associated with the PDU set after receiving at least K symbols.

20 Claims, 13 Drawing Sheets

(51) Int. Cl.
*H04W 72/21* (2023.01)
*H04W 80/02* (2009.01)

(56) References Cited

U.S. PATENT DOCUMENTS

| | | | | |
|---|---|---|---|---|
| 2022/0116987 | A1* | 4/2022 | Chin | H04W 72/1268 |
| 2023/0148234 | A1* | 5/2023 | Dutta | H04W 72/40<br>370/329 |
| 2023/0269026 | A1* | 8/2023 | Zheng | H04L 1/0076<br>714/726 |

OTHER PUBLICATIONS

Zhang M., et al., "Efficient Utilization of Rateless LDPC Codes for Satellite Broadcasting Services", 2016, 8th International Conference on Wireless Communications & Signal Processing (WCSP), IEEE, Oct. 13, 2016, XP033001970, 5 Pages.
Zhang M et al., "Soft Decoding Method for Systematic Raptor Codes", IET Communications, The Institution of Engineering and Technology, GB, vol. 9, No. 16, Nov. 5, 2015, XP006054107, ISSN: 1751-8628, pp. 1933-1940.

* cited by examiner

EARLY TERMINATION FOR OUTER CODING IN ACCORDANCE WITH USER EQUIPMENT FEEDBACK

FIELD OF THE DISCLOSURE

Aspects of the present disclosure generally relate to wireless communication and specifically relate to techniques, apparatuses, and methods associated with early termination for outer coding in accordance with user equipment (UE) feedback.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

Outer coding (OC) may be used to improve latency and reduce power consumption for protocol data unit (PDU) transmissions. In some cases, performing outer coding may include using a forward error correction (FEC) to add one or more parity symbols to a PDU set, such as after a last slot or a last symbol of the PDU set. The parity symbols may generally include redundant information associated with the PDU set transmission, and may improve a recovery probability for the PDU set in a manner that is more efficient than hybrid automatic repeat request (HARQ) retransmissions and/or lowering a modulation and coding scheme (MCS). For example, HARQ retransmissions can reduce latency associated with traffic bursts and/or prevent a UE from entering a sleep state, and a lower MCS may result in an increased latency and/or reduced capacity relative to FEC. OC techniques can improve latency and power consumption relative to HARQ retransmissions and/or a lower MCS by generating redundant packets (often referred to as "parity symbols") from original packets (often referred to as "source symbols"), and transmitting extra parity symbols to the UE without waiting for a retransmission turn-around time such that the UE can finish decoding the transmission earlier, which can reduce latency and power consumption by allowing the UE to enter a sleep state sooner. However, in some cases, transmission of the extra parity symbols may result in unnecessary overhead. For example, when a quantity of symbols received by the UE equals or exceeds a quantity of source symbols associated with a PDU set, a probability of the UE being able to recover the full transmission is very high (for example, greater than 99 percent). In such cases, further transmission of redundant information, such as parity symbols, consumes system resources while providing marginal improvement to the recovery probability.

SUMMARY

Some aspects described herein relate to a user equipment (UE) for wireless communication. The UE may include one or more memories storing processor readable code and one or more processors coupled with the one or more memories. The one or more processors may be individually or collectively operable to cause the UE to receive, from a network node, encoded packets associated with a protocol data unit (PDU) set that corresponds to a quantity of source symbols associated with an outer coding (OC). The one or more processors may be individually or collectively operable to cause the UE to transmit, to the network node in association with the encoded packets received from the network node including a quantity of received symbols that equals or exceeds the quantity of source symbols in the PDU set, feedback indicating to the network node to terminate transmission of parity symbols associated with the PDU set.

Some aspects described herein relate to a network node for wireless communication. The network node may include one or more memories storing processor readable code and one or more processors coupled with the one or more memories. The one or more processors may be individually or collectively operable to cause the network node to transmit, to a UE, encoded packets associated with a PDU set that corresponds to a quantity of source symbols associated with an OC. The one or more processors may be individually or collectively operable to cause the network node to receive, from the UE, feedback indicating to the network node to terminate transmission of parity symbols associated with the PDU set in association with the encoded packets received at the UE including a quantity of received symbols that equals or exceeds the quantity of source symbols in the PDU set. The one or more processors may be individually or collectively operable to cause the network node to terminate transmission of parity symbols associated with the PDU set in accordance with the feedback received from the UE.

Some aspects described herein relate to a method for wireless communication by a UE. The method may include receiving, from a network node, encoded packets associated with a PDU set that corresponds to a quantity of source symbols associated with an OC. The method may include transmitting, to the network node in association with the encoded packets received from the network node including a quantity of received symbols that equals or exceeds the quantity of source symbols in the PDU set, feedback indicating to the network node to terminate transmission of parity symbols associated with the PDU set.

Some aspects described herein relate to a method for wireless communication by a network node. The method may include transmitting, to a UE, encoded packets associated with a PDU set that corresponds to a quantity of source symbols associated with an OC. The method may include receiving, from the UE, feedback indicating to the network node to terminate transmission of parity symbols associated with the PDU set in association with the encoded packets received at the UE including a quantity of received symbols that equals or exceeds the quantity of source symbols in the PDU set. The method may include terminating transmission of parity symbols associated with the PDU set in accordance with the feedback received from the UE.

Some aspects described herein relate to a non-transitory computer-readable medium that stores a set of instructions for wireless communication by a UE. The set of instructions, when executed by one or more processors of the UE, may cause the UE to receive, from a network node, encoded packets associated with a PDU set that corresponds to a quantity of source symbols associated with an OC. The set of instructions, when executed by one or more processors of the UE, may cause the UE to transmit, to the network node in association with the encoded packets received from the network node including a quantity of received symbols that equals or exceeds the quantity of source symbols in the PDU set, feedback indicating to the network node to terminate transmission of parity symbols associated with the PDU set.

Some aspects described herein relate to a non-transitory computer-readable medium that stores a set of instructions for wireless communication by a network node. The set of instructions, when executed by one or more processors of the network node, may cause the network node to transmit, to a UE, encoded packets associated with a PDU set that corresponds to a quantity of source symbols associated with an OC. The set of instructions, when executed by one or more processors of the network node, may cause the network node to receive, from the UE, feedback indicating to the network node to terminate transmission of parity symbols associated with the PDU set in association with the encoded packets received at the UE including a quantity of received symbols that equals or exceeds the quantity of source symbols in the PDU set. The set of instructions, when executed by one or more processors of the network node, may cause the network node to terminate transmission of parity symbols associated with the PDU set in accordance with the feedback received from the UE.

Some aspects described herein relate to an apparatus for wireless communication. The apparatus may include means for receiving, from a network node, encoded packets associated with a PDU set that corresponds to a quantity of source symbols associated with an OC. The apparatus may include means for transmitting, to the network node in association with the encoded packets received from the network node including a quantity of received symbols that equals or exceeds the quantity of source symbols in the PDU set, feedback indicating to the network node to terminate transmission of parity symbols associated with the PDU set.

Some aspects described herein relate to an apparatus for wireless communication. The apparatus may include means for transmitting, to a UE, encoded packets associated with a PDU set that corresponds to a quantity of source symbols associated with an OC. The apparatus may include means for receiving, from the UE, feedback indicating to the network node to terminate transmission of parity symbols associated with the PDU set in association with the encoded packets received at the UE including a quantity of received symbols that equals or exceeds the quantity of source symbols in the PDU set. The apparatus may include means for terminating transmission of parity symbols associated with the PDU set in accordance with the feedback received from the UE.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
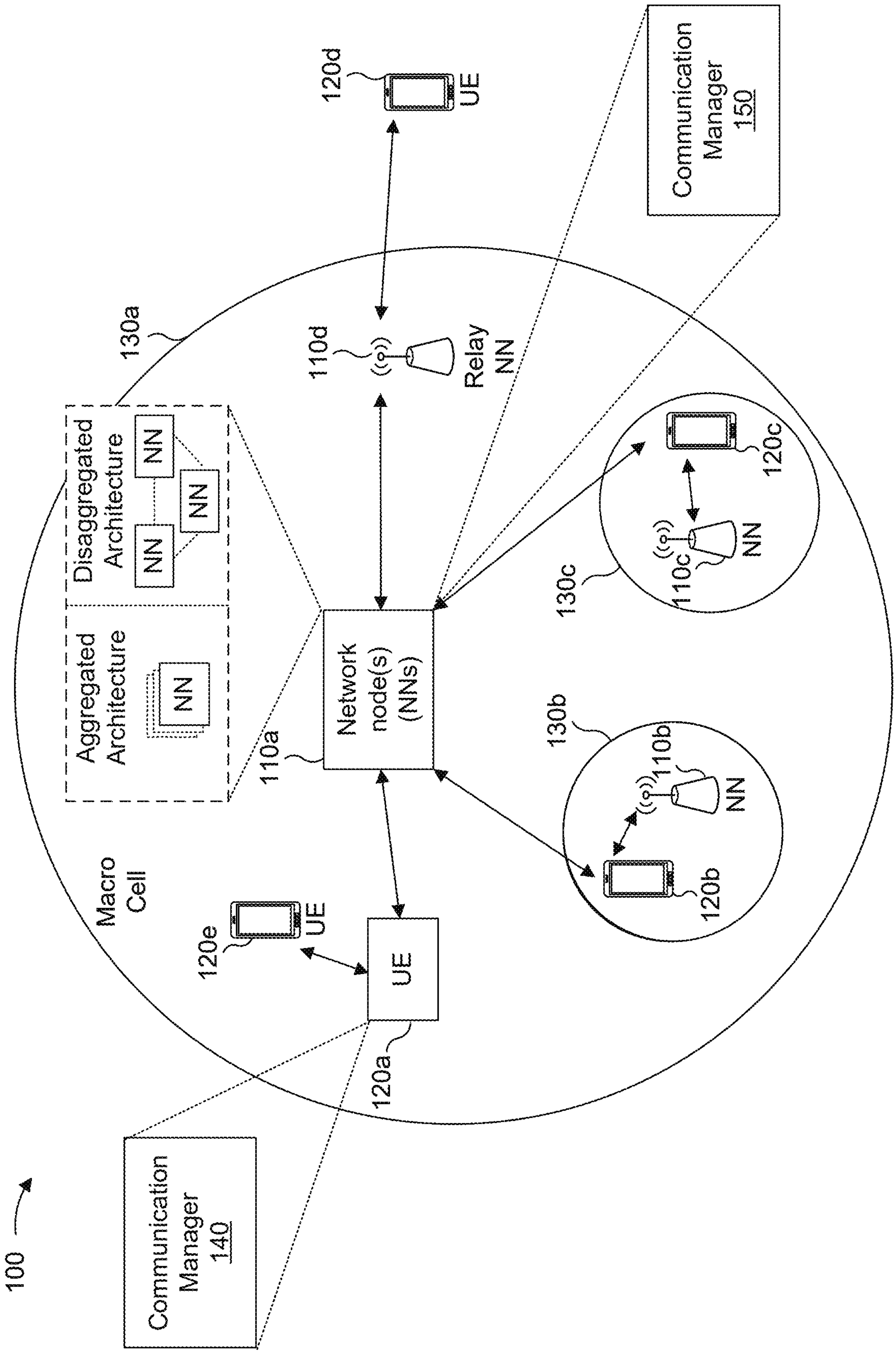
FIG. 1 is a diagram illustrating an example of a wireless network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to early termination for outer coding (OC) in accordance with UE feedback. Some aspects more specifically relate to a UE transmitting, to a network node, feedback that includes an indication to terminate transmission of parity symbols associated with a protocol data unit (PDU) set after the UE has successfully received, from the network node, a quantity of symbols that equals or exceeds a quantity of source symbols associated with the PDU set. For example, in some aspects, a network node may generate an OC block that corresponds to a PDU set to be transmitted to a UE, where the OC block includes K source symbols (or original packets) and additional parity symbols (or redundant packets) that are generated from the K source symbols. In some aspects, the network node may then generate encoded packets from the source symbols and the parity symbols, and transmit the encoded packets to the UE. Accordingly, because a recovery probability for the PDU set is greater than 99% after a quantity of symbols received at the UE equals or exceeds K, or the quantity of source symbols associated with the PDU set, the UE may transmit, to the network node, feedback that includes an indication to terminate transmission of the parity symbols after a quantity of symbols received at the UE equals or exceeds K.

Particular aspects of the subject matter described in this disclosure can be implemented to realize one or more of the following potential advantages. In some examples, the described techniques can be used to reduce overhead associated with OC techniques by discarding packets associated with a PDU set or an OC block after the UE has received a sufficient quantity of symbols or packets to guarantee a high recovery probability of the PDU set or OC block. Furthermore, in some examples, the described techniques can be used to free resources (for example, transmission resources and/or network resources) that would otherwise have been used to transmit parity symbols or other redundant information to the UE, such that the freed resources can be allocated to other UEs and/or other data transmissions. In this way, the described techniques increase efficiency of OC techniques while also ensuring that UEs have a very high probability of recovering PDU sets that are encoded using OC techniques.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*e*.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHz, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, in accordance with user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) in accordance with changing network conditions in the wireless communication network 100 and/or in accordance with the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs". An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120*a* and UE 120*e*) may communicate directly with one another using sidelink communications (for example, without communicating by way of a network node 110 as an intermediary). As an example, the UE 120*a* may directly transmit data, control information, or other signaling as a sidelink communication to the UE 120*e*. This is in contrast to, for example, the UE 120*a* first transmitting data in an uplink (UL) communication to a network node 110, which then transmits the data to the UE 120*e* in a downlink (DL) communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, the UE 120 may include a communication manager 140. As described in more detail elsewhere herein, the communication manager 140 may receive, from a network node 110, encoded packets associated with a PDU set that corresponds to a quantity of source symbols associated with an OC; and transmit, to the network node 110 in association with the encoded packets received from the network node 110 including a quantity of received symbols that equals or exceeds the quantity of source symbols in the PDU set, feedback indicating to the network node 110 to terminate transmission of parity symbols associated with the PDU set. Additionally, or alternatively, the communication manager 140 may perform one or more other operations described herein.

In some aspects, the network node 110 may include a communication manager 150. As described in more detail elsewhere herein, the communication manager 150 may transmit, to a UE 120, encoded packets associated with a PDU set that corresponds to a quantity of source symbols associated with an OC; receive, from the UE 120, feedback indicating to the network node 110 to terminate transmission of parity symbols associated with the PDU set in association with the encoded packets received at the UE 120 including a quantity of received symbols that equals or exceeds the quantity of source symbols in the PDU set; and terminate transmission of parity symbols associated with the PDU set in accordance with the feedback received from the UE 120. Additionally, or alternatively, the communication manager 150 may perform one or more other operations described herein.

Figure 2:
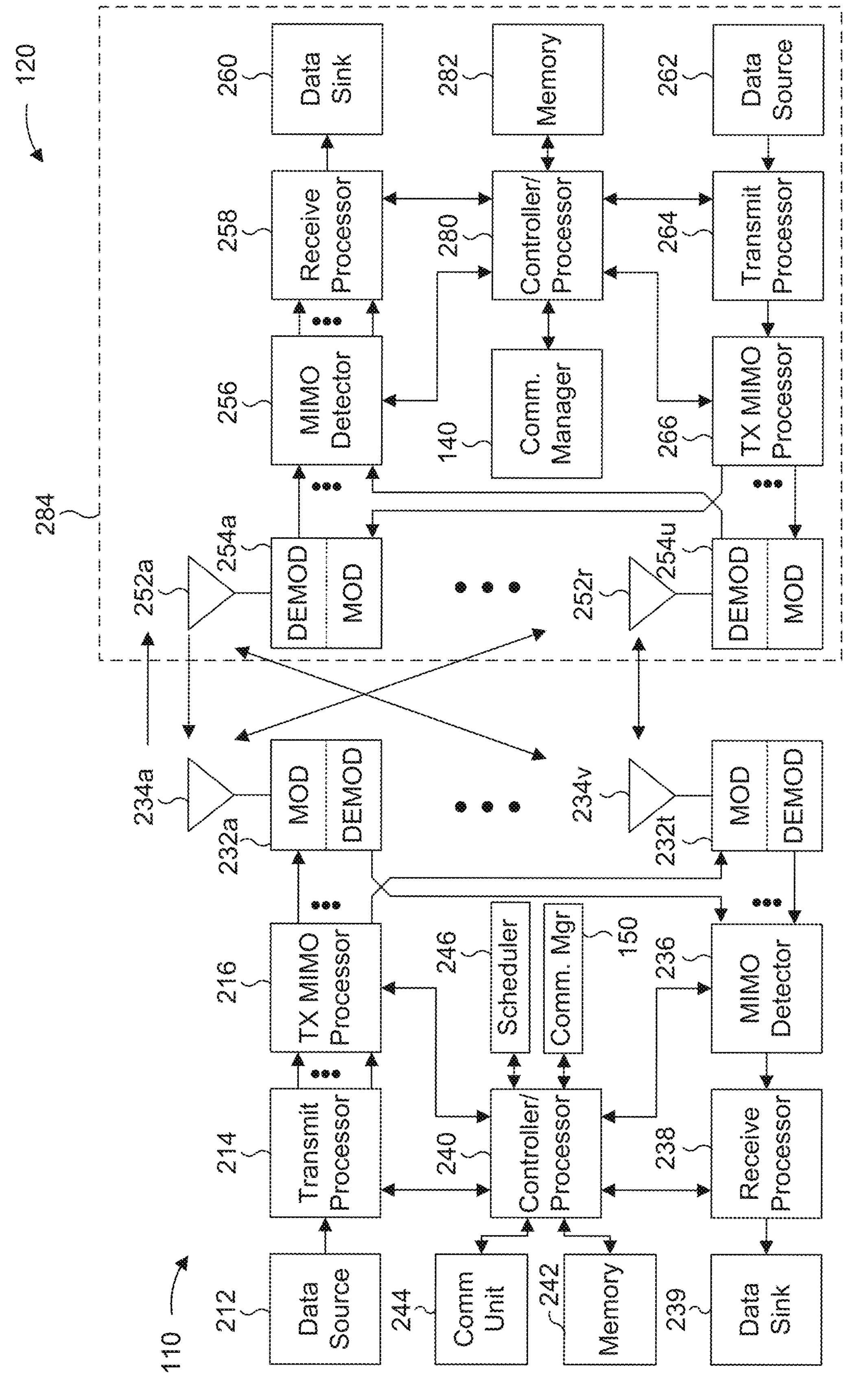
FIG. 2 is a diagram illustrating an example network node in communication with a user equipment (UE) in a wireless network in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing ((OFDM)) to obtain an output sample stream. Each modem 232 may further use the respective modulator component to process (for example, convert to analog, amplify, filter, and/or upconvert) the output sample stream to obtain a time domain downlink signal. The modems 232*a* through 232*t* may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*u* may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

Figure 3:
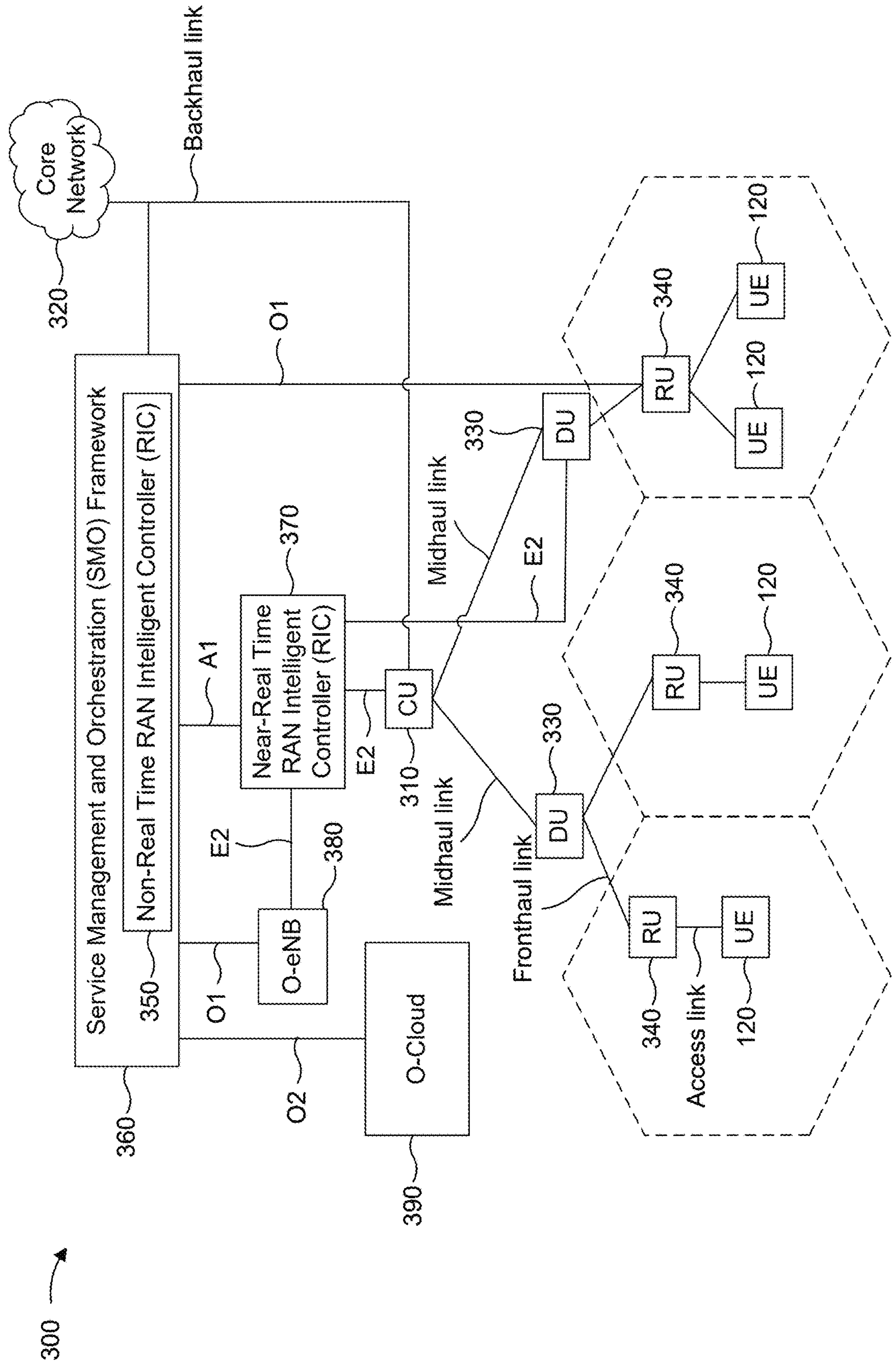
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with early termination for OC in accordance with UE feedback, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 1000 of FIG. 10, process 1100 of FIG. 11, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 1000 of FIG. 10, process 1100 of FIG. 11, or other processes as described herein. In some examples, executing instructions may include running the instructions, converting the instructions, compiling the instructions, and/or interpreting the instructions, among other examples.

In some aspects, the UE 120 includes means for receiving, from a network node 110, encoded packets associated with a PDU set that corresponds to a quantity of source symbols associated with an OC; and/or means for transmitting, to the network node 110 in association with the encoded packets received from the network node 110 including a quantity of received symbols that equals or exceeds the quantity of source symbols in the PDU set, feedback indicating to the network node 110 to terminate transmission of parity symbols associated with the PDU set. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting, to a UE 120, encoded packets associated with a PDU set that corresponds to a quantity of source symbols associated with an OC; means for receiving, from the UE 120, feedback indicating to the network node 110 to terminate transmission of parity symbols associated with the PDU set in association with the encoded packets received at the UE 120 including a quantity of received symbols that equals or exceeds the quantity of source symbols in the PDU set; and/or means for terminating transmission of parity symbols associated with the PDU set in accordance with the feedback received from the UE 120. The means for the network node 110 to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246.

Figure 4:
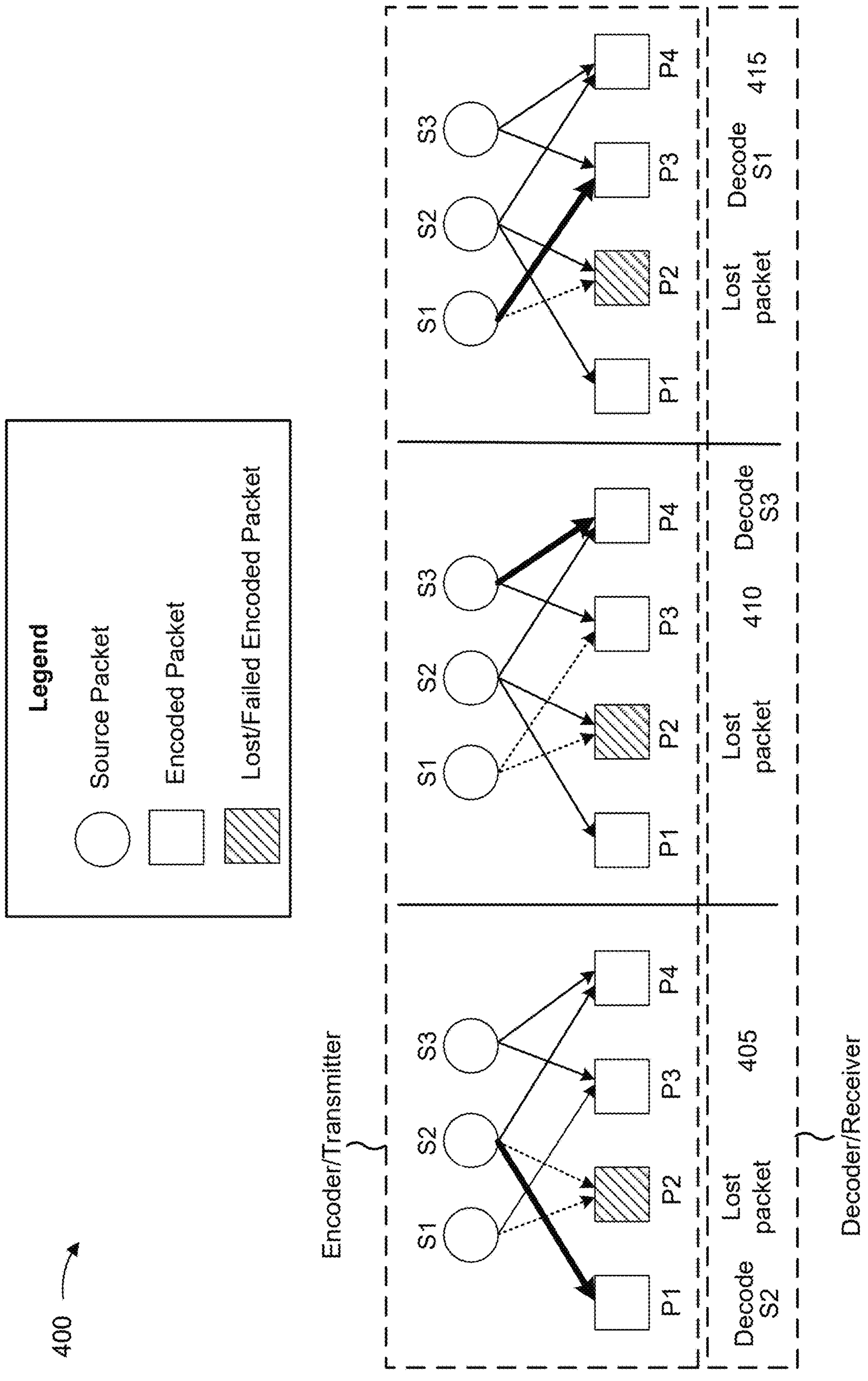
FIGS. 4-5 are diagrams illustrating examples of network coding in accordance with the present disclosure.

FIG. 4 is a diagram illustrating an example 400 of network coding in accordance with the present disclosure. Network coding may also be referred to as outer coding and/or erasure coding and recovery. As shown in FIG. 4, an encoder (or transmitter) may communicate with a decoder (or receiver). The encoder is sometimes also referred to as a transmitter, an encoder node, or a transmitter node. The encoder may include a UE 120, a network node 110, and/or an IAB device, among other examples. An IAB device may include an IAB donor (for example, a CU of an IAB donor and/or a DU of an IAB donor) or an IAB node (for example, a DU of an IAB node and/or a mobile termination (MT) of an IAB node). The decoder is sometimes also referred to as a receiver, a decoder node, or a receiver node. The decoder may include a UE 120, a network node 110, and/or an IAB device, among other examples.

As shown in FIG. 4, an encoder (or transmitter) may encode data, shown as a set of source packets or original packets (p1, p2, and p3), into a set of encoded packets using network coding. While FIG. 4 uses "packets" as example data, it is understood that the data may include any type of communication (for example, transport blocks), and is not limited to packets. An encoded packet may be the same as a source packet, may be a redundancy version of a source packet, may include a combination of multiple source packets (for example, a subset of the source packets), and/or may include a redundancy version of the combination. The quantity of encoded packets may be the same as or different than the quantity of source packets. In some aspects, the quantity of encoded packets may be unlimited (for example, the encoder may generate any quantity of encoded packets), such as when using an outer coding or a network coding scheme. In example 400, the encoder encodes K source packets (where K=3) into N encoded packets (where N=4). The encoder transmits the encoded packets to a decoder (or receiver). The decoder uses network coding to decode the encoded packets and recover the source packets. As described herein, the receiver may recover the packets as long as the quantity of received packets equals or exceeds K (the quantity source packets), no matter which packets are received. As described herein, network coding may be performed using any type of network coding scheme, such as fountain coding, linear network coding, random linear network coding, Luby transform (LT) network coding, and/or Raptor network coding.

In example 400, the encoder encodes three source packets (S1, S2, and S3) into four encoded packets: P1 (for example, that carries S2), P2 (for example, that carries S1+S2), P3 (for example, that carries S1+S3), and P4 (for example, that carries S2+S3). The encoder may transmit the four encoded packets to the decoder. In this example, the packet P2 (carrying S1+S2) is not successfully received by the decoder. In a first operation 405, the decoder decodes the packet P1 (carrying S2). In a second operation 410, the decoder obtains S3 from the packet P4 (carrying S2+S3) because the decoder has already decoded S2 and can use combining to obtain S3 from S2+S3. In a third operation 415, the decoder obtains S1 from the packet P3 (carrying S1+S3) because the decoder has already decoded S3 and can use combining to obtain S1 from S1+S3. In some aspects, an encoded packet may include an indication (for example, in a header of the encoded packet) that indicates the source packet(s) that are included in the encoded packet. Thus, the decoder can obtain S1, S2, and S3 despite P2 failing, and using less overhead than PDCP duplication. For example, PDCP duplication may duplicate all of the source packets for a total of six transmissions, while the example network coding shown in FIG. 4 uses four transmissions.

In some cases, the encoder may continue to transmit encoded packets (for example, the same combination of encoded packets or different combinations of encoded packets) to the decoder until the encoder receives a notification from the decoder. For example, the decoder may successfully receive the source packets or may abort decoding, which may trigger the decoder to send a notification to the encoder. The notification may include, for example, an acknowledgement (ACK) and/or a stop message (STOP). In some cases, the decoder may transmit an ACK for each original packet that is successfully received. Additionally, or alternatively, the decoder may transmit an ACK upon successful reception of all of the source packets. Upon receiving the notification, the encoder may encode additional data (for example, a new set of source packets, such as S4, S5, and S6), and may transmit encoded packets to the decoder, in a similar manner as described above, until all of the data has been transmitted and/or successfully received. Alternatively, to conserve network resources and reduce overhead, the encoder may not transmit an ACK or a negative acknowledgement (NACK) for received packets.

In some cases, such as when using a Raptor network coding scheme, the encoder may perform inner coding, or precoding, to generate a set of intermediate packets, that include a set of redundant packets, from the source packets. A redundant packet may be a copy of a source packet or a redundancy version of a source packet. In some aspects, a redundant packet may be a low density parity check (LDPC) packet. For example, the encoder may apply inner coding to generate K' intermediate packets (for example, original plus redundant packets from K source packets). The encoder may then perform outer coding (for example, fountain coding and/or LT network coding) to generate N encoded packets from the K' intermediate packets, in a similar manner as described above. As a result, the encoding and/or decoding complexity of the Raptor network coding scheme may be linear. The encoded packets may include a set of systematic packets and a set of repair packets. In some aspects, the decoder may choose to not decode a packet included in the set of systematic symbols that has a high decoding complexity (for example, is associated with a high encoding degree and/or is associated with a high quantity of source packets). The decoder may recover the source packets associated with the packet that is not decoded from one or more packets included in the set of repair packets. The one or more packets included in the set of repair packets may be associated with a lower decoding complexity. As a result, the decoding complexity may be reduced.

In some examples, the network coding may be viewed as a linear system (for example, over a Galois field) with three variables and four linearly independent constraints. For example, the three variables may correspond to the source packets (for example, s1, s2, and s3) and the four linearly independent constraints may correspond to the four encoded packets. Using the linear system, any of the three variables that have been subject to an erasure (for example, transmission error) may be recovered using a portion of the three original packets and a portion of the four encoded packets. Network coding (for example, erasure coding and recovery) may enable a UE to recover a communication that has been erased (for example, lost or corrupted) during transmission. The recovery of the erased communication, without requiring retransmission by the network node, may reduce the overall quantity of retransmissions by the network node and may reduce the overall load on the network.

Figure 5:
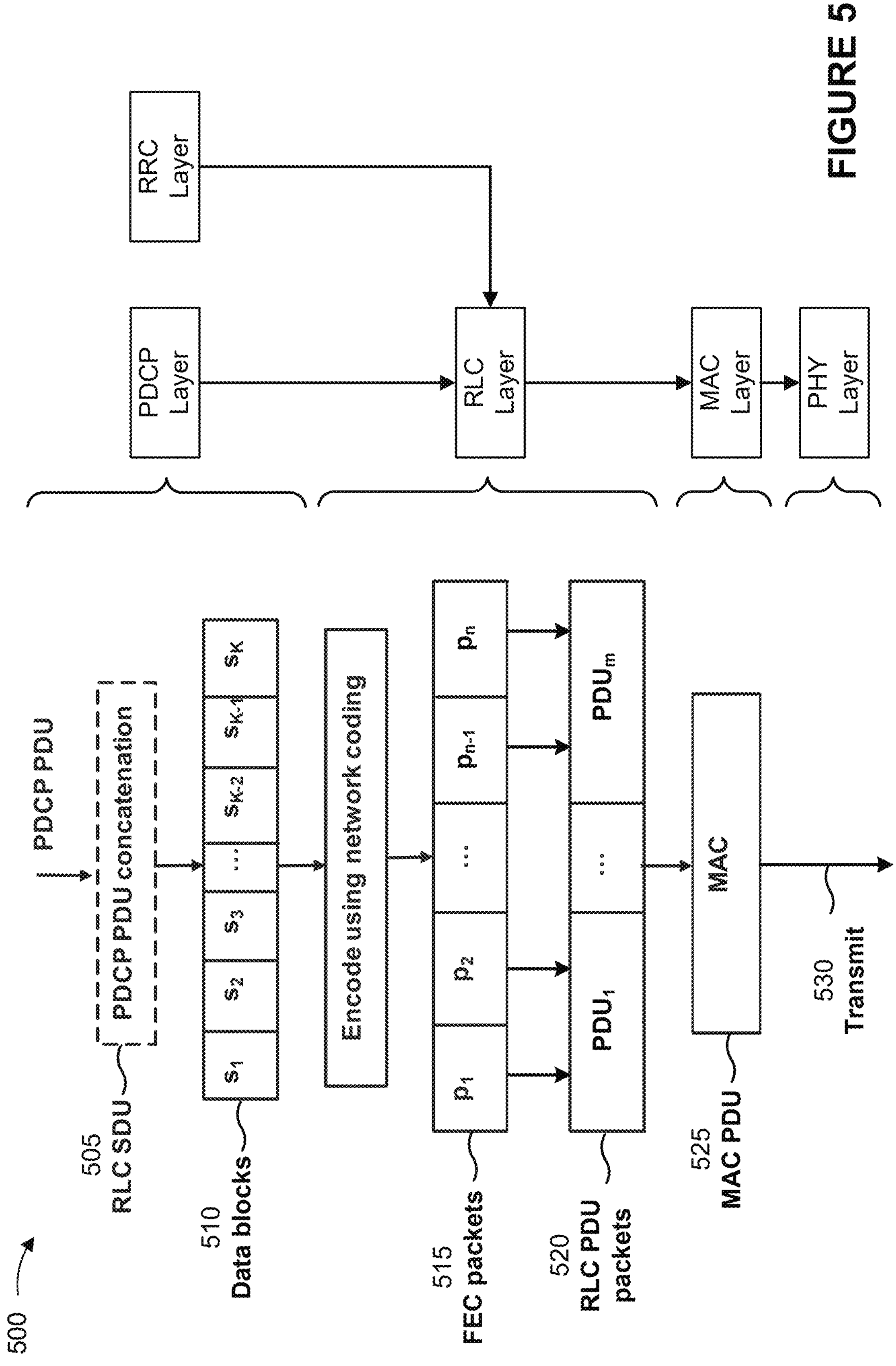

FIG. 5 is a diagram illustrating an example 500 of network coding, in accordance with the present disclosure. The operations described in connection with FIG. 5 may be performed by a transmitter (also referred to as an encoder), such as a UE 120 or a network node 110.

As shown by reference number 505, a transmitter may generate an RLC service data unit (SDU) from one or more PDCP protocol data units (PDUs). In some aspects, a single PDCP PDU is included in an RLC SDU. In some aspects, multiple PDCP PDUs are included in an RLC SDU (for example, by concatenating multiple PDCP PDUs). In some aspects, the transmitter determines whether to include a single PDCP PDU in a single RLC SDU or whether to concatenate multiple PDCP PDUs in a single RLC SDU in accordance with a size of the PDCP PDU. For example, if the size of the PDCP PDU satisfies (for example, is greater than or equal to) a threshold, then the transmitter may include only the PDCP PDU (for example, a single PDCP PDU) in a single RLC SDU. If the size of the PDCP PDU does not satisfy (for example, is less than or equal to) the threshold, then the transmitter may concatenate multiple PDCP PDUs (for example, a set of PDCP PDUs with a total size that is less than or equal to the threshold) into a single RLC SDU.

As shown by reference number 510, the transmitter may divide the RLC SDU into a plurality of data blocks. For example, the transmitter may divide the RLC SDU into K data blocks, shown as $s_1$ through $s_K$, in accordance with the set of network coding parameters. In some aspects, the set of network coding parameters specify the value of K for a particular set of sub-parameters, such as a payload size for the RLC SDU and/or a size of a sequence number field in an RLC PDU header for the RLC SDU. In some aspects, the transmitter determines the value of K for a set of sub-parameters.

In some aspects, the operations associated with reference number 505 and 510 may be performed at the PDCP layer of the transmitter. The PDCP layer may provide the data blocks to the RLC layer of the transmitter. As shown by reference number 515, the transmitter may encode the K data blocks into N FEC packets using network coding. For example, the transmitter may encode the K data blocks into the N FEC packets, shown as $p_1$ through $p_n$, in accordance with an outer code or a network code, such as a fountain code, an LT code, and/or a Raptor code, among other examples. In particular, the transmitter may encode the K data blocks into the N FEC packets such that the N FEC packets include additional information or bits for purposes of FEC. This permits FEC packets to be recovered by a receiver, for example, if the quantity of received FEC packets equals or exceeds the quantity of K data blocks regardless of which FEC packets are received. For example, a probability of recovering the FEC packets may be approximated as $$1-\frac{1}{256^{M-K+1}},$$

where M is the quantity of received FEC packets, and where the recovery probability has a value of 0 when M is less than K or a value that exceeds 99% when M is greater than or equal to K.

In some aspects, the quantity of RLC packets (for example, the value of N) is associated with the set of network coding parameters. In some aspects, the set of network coding parameters specifies the value of N for a particular set of sub-parameters, a delay budget for the RLC SDU, available encoding and decoding computation resources of the transmitter, the value of K (for example, the quantity of data blocks), a target error probability for one or more RLC PDU packets for the N FEC packets, channel conditions for transmission of the RLC PDU packets(s), and/or the type of network code that is to be used to encode the K data blocks into the N FEC packets, among other examples. In some aspects, the transmitter may determine the value of N for a set of sub-parameters.

As shown by reference number 520, the transmitter may map the N FEC packets to a corresponding M RLC PDU packets. For example, the transmitter may map N FEC packets to M RLC PDU packets, shown as $PDU_1$ through $PDU_m$, such that each RLC PDU includes a plurality of FEC packets (for example, two FEC packets per RLC PDU packet, four FEC packets per RLC PDU packet, or another quantity of FEC packets per RLC PDU packet). In some aspects, the operations associated with reference number 515 and 520 are performed at the RLC layer of the transmitter. The RLC layer may receive an indication of the set of network coding parameters from the RRC layer and may perform the operations associated with reference number 515 and 520 in accordance with the set of network coding parameters.

The RLC layer may provide the M RLC PDU packets to the MAC layer of the transmitter. As shown by reference number 525, the transmitter may generate a MAC PDU for the M RLC PDU packets. In some aspects, the MAC PDU includes an RLC PDU header or a MAC PDU header, which may include information associated with each of the M RLC PDUs. For example, the RLC PDU header or MAC PDU header may include a sequence number field, which may indicate a sequence number associated with each of the M RLC PDUs. In some aspects, the operations associated with reference number 525 are performed at the MAC layer of the transmitter.

The MAC layer of the transmitter may provide the MAC PDU to the PHY layer of the transmitter. As shown by reference number 530, the transmitter may transmit the M RLC PDU packets (for example, in the MAC PDU) to a receiver (also referred to as a decoder), such as a UE 120 or a network node 110. In some aspects, the PHY layer of the transmitter may transmit the M RLC PDU packets (for example, in the MAC PDU) over a wireless physical channel, such as a PDSCH, a PDCCH, a PUSCH, a PUCCH, a PSCCH, and/or a PSSCH.

Figure 6:
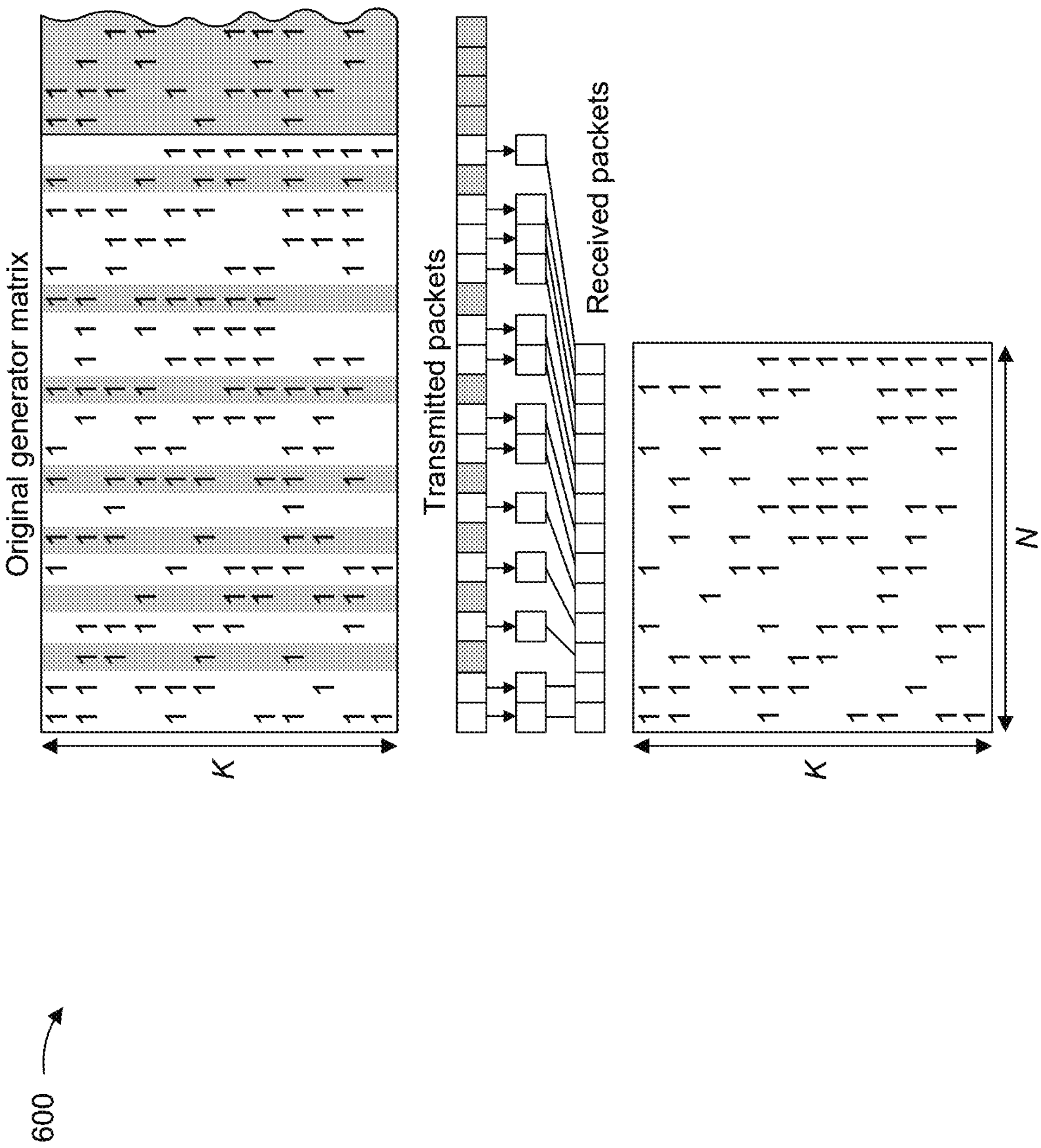
FIG. 6 is a diagram illustrating an example of rateless code generation in accordance with the present disclosure.

FIG. 6 is a diagram illustrating an example 600 of rateless code generation, in accordance with the present disclosure. Rateless codes use a potentially limitless sequence of encoding symbols. Accordingly, transmitted packets may be recovered from any subset of the encoding symbols as long as the size of the subset is equal to or only slightly larger than the quantity of source symbols. Therefore, rateless codes have relatively low reception overhead (for example, less than 2%) with relatively high probability (for example, up to and including 99.9999%). Examples of rateless codes include fountain codes, such as an LT code, and/or a Raptor code.

As shown in FIG. 6, rateless codes use a generator matrix G with K rows and an unlimited quantity of columns. For example, K may depend on a size of the content to be encoded. The generator matrix G may be used to generate packets for transmission. For example, the packets for transmission may be encoded according to:

$$p_j = \sum_{k=1}^{K} s_k G_{kj}$$

where $p_j$ is packet j for transmission, $s_k$ is a portion of the content to be encoded (for example, a source packet), and $G_{kj}$ is a corresponding element of the generator matrix G. This equation is provided as an example. Other examples may differ from the equation described above.

As shown in FIG. 6, only a subset of the transmitted packets is needed to recover the content. For example, the recovered packets may be decoded according to:

$$d_k = \sum_{n=1}^{N} p_n G_{nk}^{-1}$$

where $d_k$ is a portion of the content to be recovered, $p_n$ is packet n that was received, and $$G_{nk}^{-1}$$

is a corresponding element of the inverse of the generator matrix G. Accordingly, as long as sufficient packets are received to estimate the generator matrix G to order K, and as long as the estimated matrix is invertible, the content may be recovered. This equation is provided as an example. Other examples may differ from the equation described above.

Figure 7:
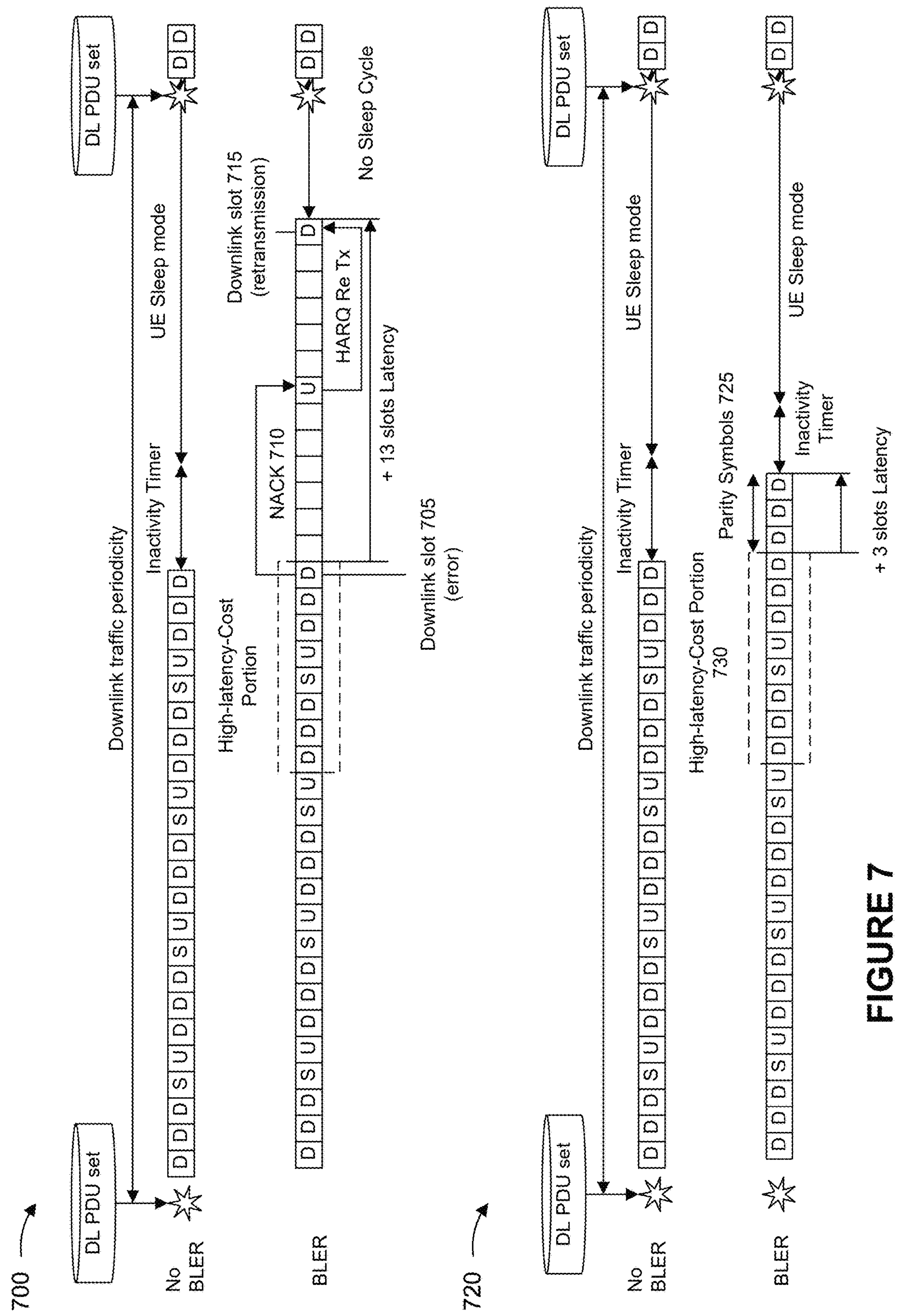
FIG. 7 is a diagram illustrating examples of outer coding reducing latency and power relative to retransmission in accordance with the present disclosure.

FIG. 7 is a diagram illustrating examples 700, 720 of outer coding reducing latency and power relative to retransmission in accordance with the present disclosure.

As described herein, a network node may perform a downlink transmission that includes a PDU set. In some cases, the PDU set may have strict latency and/or power requirements, such as in cases where the PDU set is associated with XR traffic with characteristics that include a relatively high data rate, a stringent latency bound, and/or reliability requirements. For example, typical values for an XR application may include a 50 megabits per second (Mbps) data rate at 90 frames per second (fps) for video, 1 Mbps for audio, an average round trip time of 15 milliseconds (ms), a $99^{th}$ percentile round trip time of 22 ms, a packet delay budget (PDB) of ten ms, and/or a power consumption requirement of less than 1 watt (W).

In some cases, one or more errors may occur during a transmission of a PDU set. In this case, a retransmission of one or more slots of the PDU set may be used for error correction. The retransmission may be, for example, an automatic repeat request (ARQ) retransmission or a hybrid ARQ (HARQ) retransmission. Additionally, or alternatively, a lower MCS may be used to transmit (or retransmit) the PDU set to improve reliability. However, retransmissions are inefficient, because retransmissions increase latency for downlink traffic bursts and may result in additional power consumption to receive the PDU set (for example, by preventing the UE from entering a sleep state). Furthermore, a lower MCS may result in a higher latency and/or a lower latency relative to FEC or OC techniques described herein.

For example, as shown in example 700, a downlink PDU set may be transmitted using time domain resources that include a plurality of downlink slots (D), uplink slots (U), and special slots (S). In one example, the plurality of slots may include 23 slots. After a transmission of the PDU set with no block error rate (BLER) (for example, all downlink transmissions of the PDU set are successfully received), a UE may initiate an inactivity timer, and may enter into a sleep mode after an expiration of the inactivity timer. This may enable the UE to conserve energy resources. However, for a PDU set with a BLER, a downlink transmission associated with the PDU set may not be successfully received by the UE in a downlink slot 705. In this case, the UE may transmit a NACK 710 to the network node in a next uplink slot, which is seven slots after the downlink slot 705 in which the error occurred. As further shown in FIG. 7, a retransmission 715 of the downlink transmission that was not successfully received may occur six slots after the NACK 710. This may introduce a latency of thirteen slots and may prevent the UE from initiating the inactivity timer and entering the sleep mode.

In some cases, OC may be used to improve latency and reduce power consumption for PDU set transmissions. Outer coding may include using an FEC to generate parity symbols (or redundant packets) associated with a PDU set from source symbols (or original packets) associated with the PDU set. Accordingly, the network node can then send the extra parity symbols to the UE without waiting for a NACK or other retransmission turn-around time, which can allow the UE to finish receiving the transmission sooner. For example, the parity symbols may include redundant information associated with the PDU set transmission, and may improve a recovery probability for the PDU set without introducing delays associated with HARQ retransmissions and/or a lower MCS. As shown in example 720, for a PDU set with a BLER, parity symbols 725 may be transmitted to the UE after the network node has finished transmitting all of the source symbols associated with the PDU set. The parity symbols 725 may include redundant information from a high-latency-cost portion 730 of the PDU set. In example 720, the parity symbols 725 may introduce a latency of three slots to the PDU set transmission, which may allow for the UE to initiate the inactivity timer and enter a sleep mode for conserving UE power resources. Furthermore, the three-slot latency associated with the parity symbols 725 is significantly less than the thirteen-slot latency associated with retransmission.

Figure 8:
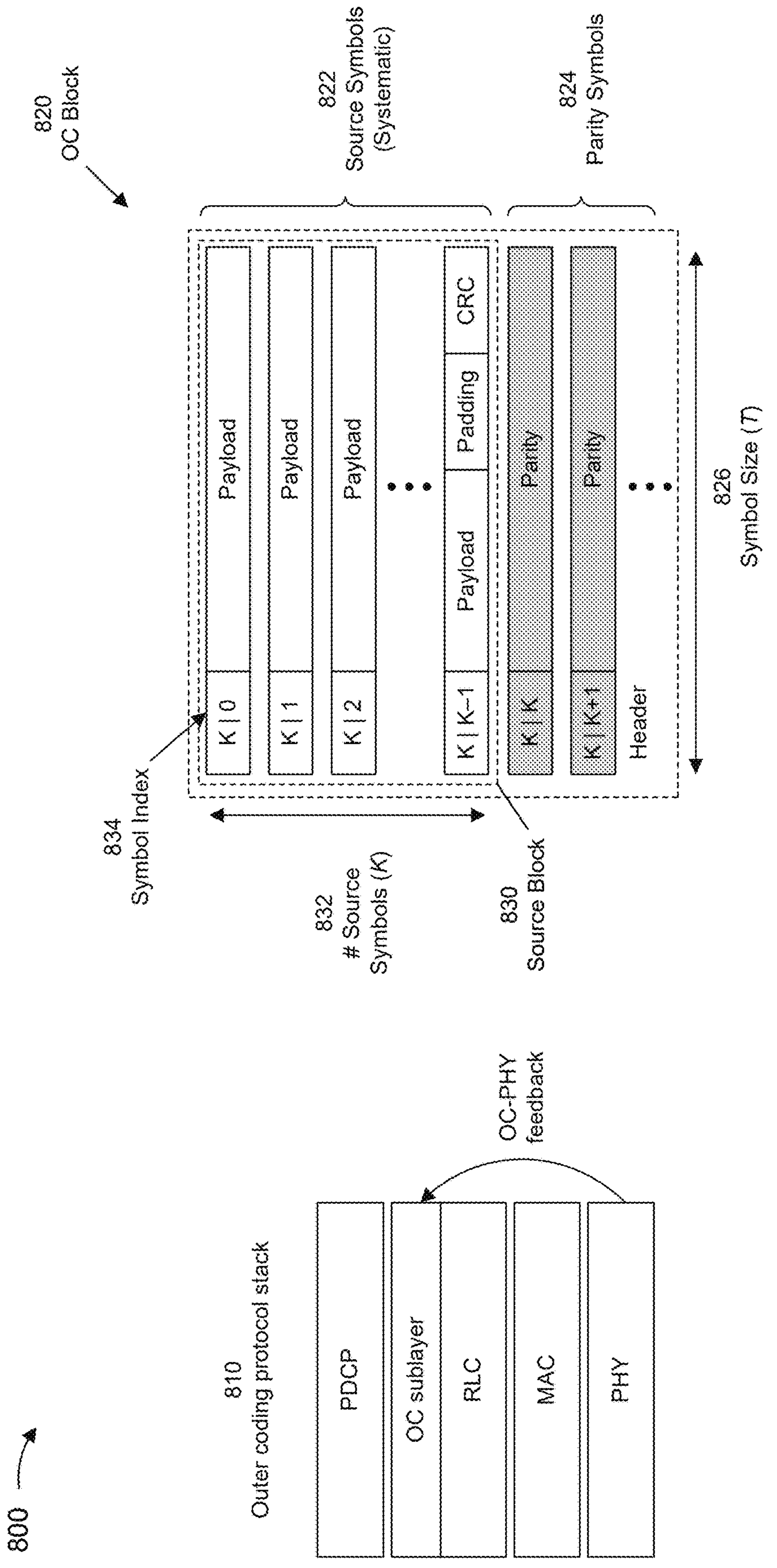
FIG. 8 is a diagram illustrating an example of a protocol stack including an outer coding sublayer that may generate an outer coding block in accordance with the present disclosure.

FIG. 8 is a diagram illustrating an example 800 of a protocol stack 810 including an OC sublayer that may generate an OC block 820 in accordance with the present disclosure.

As described herein, a PDU is a unit of data that can vary in accordance with a specific protocol or layer within a protocol stack. At a networking layer (for example, Layer 3), a PDU may be referred to as a packet. A packet may include data associated with the PDU and may include header information for routing, error checking, and control functions, among other examples. Certain applications may consume data in PDU sets (rather than individual IP packets). For example, an XR application may consume one video frame per burst, or multiple slices of a video frame per burst, among other examples. A burst may include a set of IP packets that are to be delivered to a device at a same time. For example, the burst may include all slices of a video frame. In some cases, a PDU set may include a plurality of IP packets that correspond to a unit of information for the application. For example, the PDU set may include a slice of a video frame (for example, that can be FEC protected). In some cases, FEC may be used to add one or more parity symbols to a PDU set. In one example, a set of symbols that are considered together for FEC may be referred to as an OC block 820. A symbol is a unit of data to be used for the FEC. In one example, a first K symbols of the OC block 820 may be source symbols 822 (for example, systematic symbols) and a remainder of the symbols in the OC block 820 may be the parity symbols 824 (for example, repair symbols). Furthermore, the source symbols 822 and the parity symbols 824 each have a symbol size 826. The first K symbols of the OC block 820 (for example, the source symbols 822) form a source block 830, and the source symbols 822 and the parity symbols 824 each have a header that indicates the quantity of source symbols 832, K, and a symbol index 834. For example, the source symbols 822 have a symbol index 834 in a range from 0 to K−1, and the parity symbols 824 have symbol indexes 834 that increase in increments starting from K.

In some cases, within the protocol stack 810, the OC block 820 may be generated at an OC sublayer that may be integrated into an RLC layer. For example, as shown in FIG. 8, the OC sublayer may be integrated into the RLC layer, between the RLC layer and a PDCP layer, such that the OC sublayer may reuse the natural segmentation functionality provided by the RLC layer to allow segmentation of PDCP PDUs and to allow segmentation of OC symbols. For example, PDCP packets that belong to the same PDU set may be identified as an OC block 820 in the OC sublayer. The OC sublayer may receive feedback from the PHY layer that indicates an OC symbol size (for example, how many OC symbols were delivered by the MAC layer and the PHY layer, and how many parity symbols 824 were needed to adapt for OC redundancy determination), and may set an RLC SDU size to be equal to the OC symbol size. Accordingly, the redundancy of the OC block 820 (for example, the quantity and/or size of the parity symbols) may vary over time, depending on the feedback from the PHY layer. Furthermore, in some cases, PDCP packets may be segmented into RLC SDUs (for example, OC symbols), may be OC encoded with a desired latency, and may be provided to the RLC, MAC, and PHY layers for over-the-air (OTA) transmission. Integrating the OC sublayer into the RLC layer rather than the MAC layer may allow for segmentation of the PDCP packets (for example, because the MAC layer does not have segmentation functionality), may allow for more flexibility to perform OC on specific radio bearers having certain quality of service requirements, and/or may allow for more efficient traffic-specific operations (for example, because MAC SDUs may have packets multiplexed from different radio bearers). Similarly, integrating the OC sublayer into the RLC layer rather than the PHY layer may enable segmentation functionality (for example, because the PHY layer does not have segmentation functionality), may enable additional PDCP PDUs to be added as OC parity symbols, and may allow for DU-level processing rather than CU-level processing (which may be dynamically adapted in accordance with channel conditions).

Accordingly, as described herein, the OC sublayer may be configured to generate an OC block 820 that corresponds to one PDU set, where redundant packets or parity symbols 824 are sent together with original packets or source symbols 822 to increase reliability. The redundancy overhead (for example, the quantity of parity symbols 824 and/or the symbol size 826) can be related to each UE (for example, in accordance with a specific channel quality associated with the UE, which may be related to CSI feedback, a drop rate, and/or a latency, among other examples). Because the recovery probability of the OC block 820 is approximated as $$1-\frac{1}{256^{M-K+1}},$$

where M is the quantity of received symbols and K is the quantity of source symbols 822, the recovery probability for the OC block 820 is very high (exceeding 99%) as long as the quantity of received symbols, M, is equal to or greater than the quantity of source symbols, K. Furthermore, the UE receiving the OC block 820 may attempt to start OC decoding as soon as the UE has received at least K source symbols 822. Additionally, or alternatively, the UE may wait to receive more than K source symbols 822 to start decoding the OC block 820 at the OC sublayer, to provide a higher recovery probability.

Accordingly, as described herein, OC techniques can improve latency and power consumption relative to HARQ retransmissions and/or a lower MCS by generating redundant packets (often referred to as "parity symbols") from original packets (often referred to as "source symbols"), and transmitting extra parity symbols to the UE without waiting for a retransmission turn-around time such that the UE can finish decoding the transmission earlier, which can reduce latency and power consumption by allowing the UE to enter a sleep state sooner. However, in some cases, transmission of the extra parity symbols may result in unnecessary overhead. For example, when a quantity of symbols received by the UE equals or exceeds a quantity of source symbols associated with a PDU set, a probability of the UE being able to recover the full transmission is very high (for example, greater than 99 percent). In such cases, further transmission of redundant information, such as parity symbols, consumes system resources while providing marginal improvement to the recovery probability.

Various aspects relate generally to early termination for OC in accordance with UE feedback. Some aspects more specifically relate to a UE transmitting, to a network node, feedback that includes an indication to terminate transmission of parity symbols associated with a PDU set after the UE has successfully received, from the network node, a quantity of symbols that equals or exceeds a quantity of source symbols associated with the PDU set. For example, in some aspects, a network node may generate an OC block that corresponds to a PDU set to be transmitted to a UE, where the OC block includes K source symbols (or original packets) and additional parity symbols (or redundant packets) that are generated from the K source symbols. In some aspects, the network node may then generate encoded packets from the source symbols and the parity symbols, and transmit the encoded packets to the UE. Accordingly, because a recovery probability for the PDU set is greater than 99% after a quantity of symbols received at the UE equals or exceeds K, or the quantity of source symbols associated with the PDU set, the UE may transmit, to the network node, feedback that includes an indication to terminate transmission of the parity symbols after a quantity of symbols received at the UE equals or exceeds K.

In this way, the described techniques can reduce overhead associated with OC techniques by discarding packets associated with a PDU set or an OC block after the UE has received a sufficient quantity of symbols or packets to guarantee a high recovery probability of the PDU set or OC block. Furthermore, in some examples, the described techniques can be used to free resources (for example, transmission resources and/or network resources) that would otherwise have been used to transmit parity symbols or other redundant information to the UE, such that the freed resources can be allocated to other UEs and/or other data transmissions. In this way, the described techniques may increase efficiency of OC techniques while also ensuring that UEs have a very high probability of recovering PDU sets that are encoded using OC techniques.

Figure 9:
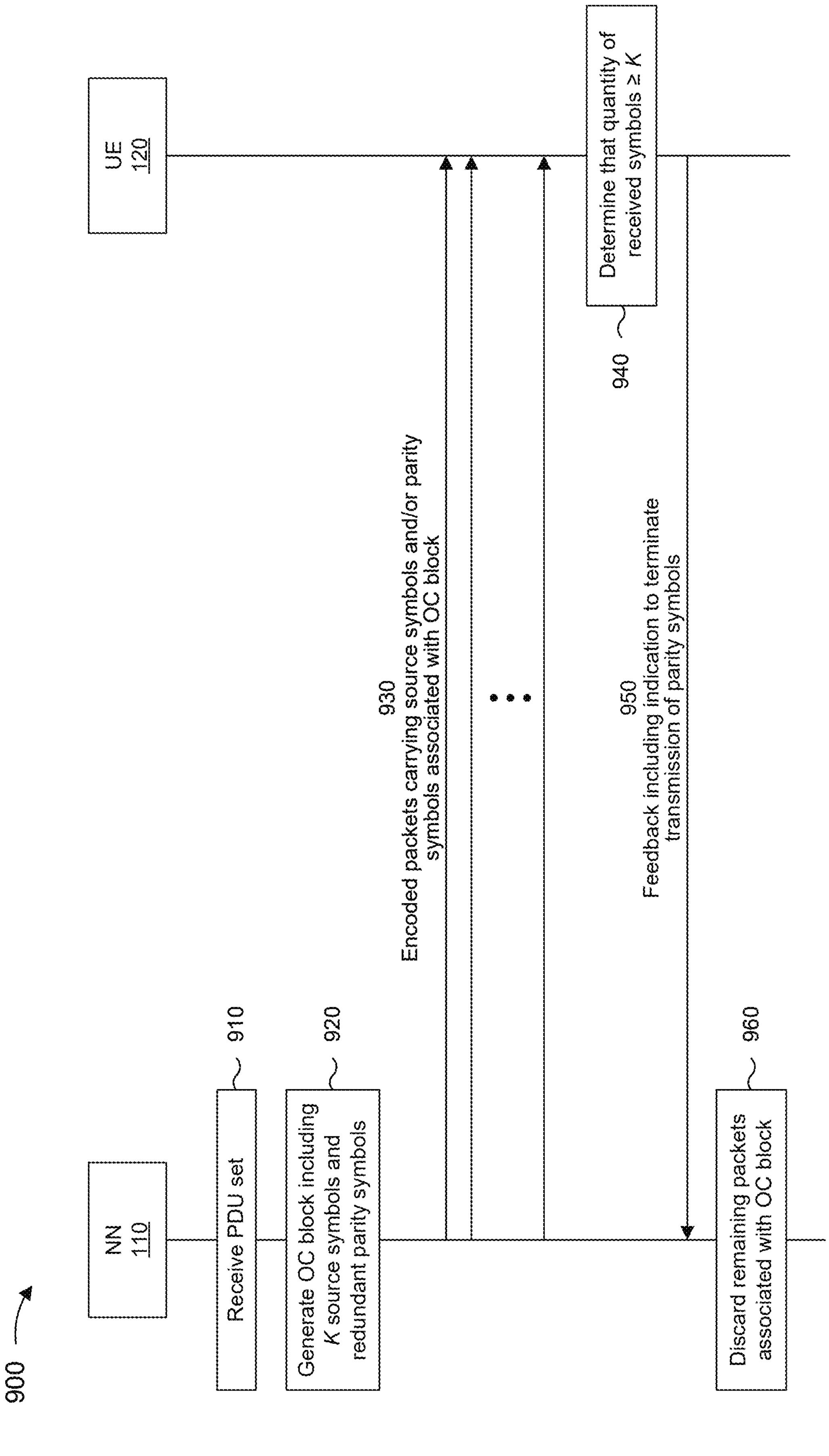
FIG. 9 is a diagram illustrating an example associated with early termination for outer coding in accordance with UE feedback in accordance with the present disclosure.

FIG. 9 is a diagram illustrating an example 900 associated with early termination for outer coding in accordance with UE feedback in accordance with the present disclosure. As shown in FIG. 9, example 900 includes communication between a network node 110 and a UE 120. The network node 110 and the UE 120 may be included in a wireless network, such as wireless network 100. The network node 110 and UE 120 may communicate via a wireless access link, which may include an uplink and a downlink.

As shown in FIG. 9, in a first operation 910, the network node 110 may receive a PDU set to be transmitted to the UE 120. For example, as described herein, the PDU set may correspond to a downlink traffic burst, such as a set of IP packets that correspond to a PDCP SDU. For example, for an XR application, the PDU set may correspond to a downlink traffic burst that includes a video frame, one or more slices of a video frame, an audio frame, an XR frame, or the like. In some aspects, the PDU set may include multiple PDCP PDUs of IP packets encapsulated within a PDCP SDU that arrives at a PDCP layer of the network node 110.

As further shown in FIG. 9, in a second operation 920, the network node 110 may generate an OC block corresponding to the PDU set. For example, in some aspects, the OC block may be generated at an OC sublayer that is integrated into an RLC layer of the network node 110, between the PDCP layer and the RLC layer. In this way, the OC sublayer may reuse the segmentation functionality of the RLC layer to enable segmentation of a PDCP PDU that includes a header and the PDCP SDU associated with the PDU set corresponding to the downlink traffic burst. Furthermore, providing the OC sublayer between the PDCP layer and the RLC layer may enable the OC sublayer to apply segmentation to OC symbols associated with the OC block.

In some aspects, at the OC sublayer, the OC block may correspond to the PDU set that includes the PDCP packets associated with the downlink traffic burst. For example, in some aspects, the PDCP SDU may be divided into K original uncoded packets, such that the OC block corresponding to the PDU set includes K source symbols (or systematic symbols) corresponding to the K original uncoded packets and one or more parity symbols (or repair symbols). In some aspects, as described herein, the quantity of parity symbols that are generated for the OC block may be specific to the UE 120, in accordance with feedback from a PHY layer of the network node 110. For example, in some aspects, the feedback from the PHY layer may include a specific channel quality, CSI, drop rate, latency, or other information specific to the UE 120, which may be used at the OC sublayer to dynamically adapt the redundancy overhead (for example, the quantity and/or size of the parity symbols) of the OC block. Furthermore, in some aspects, the redundancy overhead of the OC block may vary over time.

As further shown in FIG. 9, in a third operation 930, the network node 110 may transmit encoded packets that carry the source symbols and/or the parity symbols to the UE 120. For example, in some aspects, the network node 110 may perform an OC encoding on the K source symbols and the additional parity symbols to generate N encoded packets that include OC symbols, where each OC symbol includes one or more source symbols and/or one or more parity symbols. For example, the network node 110 may perform a random exclusive or (XOR) combination of the K source symbols and the parity symbols to generate the N encoded packets, where the quantity of the encoded packets exceeds the quantity of source symbols (N>K) to introduce redundancy to the OC symbols. The network node 110 may then schedule and transmit the N encoded packets at an RLC/MAC/PHY layer. Alternatively, in some aspects, the network node 110 may start to transmit the K source symbols while the parity symbols are being generated from the K source symbols, and the K source symbols may be scheduled and transmitted to the UE 120 at the RLC/MAC/PHY layer in parallel with the OC encoding to generate the parity symbols. In this case, the parity symbols may be delivered from the OC sublayer to the RLC/MAC/PHY layer after the OC encoding processing time is complete (for example, while the K source symbols are still being scheduled and transmitted to the UE 120), and the network node 110 may then schedule and transmit the parity symbols at the RLC/MAC/PHY layer after the K source symbols have all been scheduled and transmitted to the UE 120.

As further shown in FIG. 9, in a fourth operation 940, the UE 120 may determine that the quantity of symbols received from the network node 110, M, equals or exceeds the quantity of source symbols, K, associated with the PDU set. For example, as described herein, each symbol associated with an OC block may include a header that indicates the quantity of source symbols, K, and a symbol index. For example, the K source symbols have symbol indexes in a range from 0 to K−1, and the one or more parity symbols have symbol indexes that increment starting from K. Accordingly, the UE 120 may be able to determine the value of K from the header associated with each symbol, and may be able to determine the value of M from the quantity of received symbols with different symbol indexes. In some aspects, as described herein, a probability of the UE 120 recovering the PDCP packets that belong to the PDU set corresponding to the OC block may be approximated as $$1-\frac{1}{256^{M-K+1}},$$

which has a value that exceeds 99% when M is greater than or equal to K. Accordingly, after the UE 120 has received at least K symbols associated with the OC block, further transmission of redundant information may increase redundancy overhead without providing a significant increase in the recovery probability.

As further shown in FIG. 9, in a fifth operation 950, the UE 120 may transmit, to the network node 110, feedback that includes an indication to the network node 110 to terminate transmission of parity symbols associated with the OC block in association with the UE 120 receiving a quantity of symbols associated with the OC block that equals or exceeds the quantity of source symbols associated with the OC block. For example, in some aspects, the feedback that the UE 120 transmits to the network node 110 may include an OC sublayer status report that may be carried in UCI or a MAC-CE. In some aspects, the feedback that the UE 120 transmits to the network node 110 may include a one-bit indication to indicate whether the UE 120 has successfully decoded the PDU set at an OC sublayer of the UE 120. For example, the one-bit indication may have a first value to indicate that the UE 120 has successfully decoded the PDU set at the OC sublayer or a second value to indicate that the UE 120 has not yet successfully decoded the PDU set at the OC sublayer. Additionally, or alternatively, the feedback that the UE 120 provides to the network node 110 may include an OC block index to indicate which OC block was successfully decoded at the OC sublayer of the UE 120. Furthermore, in some aspects, the feedback that the UE 120 provides to the network node 110 may optionally further include an indication to the network node 110 to terminate MAC retransmissions associated with the PDU set and/or the OC block that corresponds to the PDU set.

As further shown in FIG. 9, in a sixth operation 960, the network node 110 may discard any remaining packets associated with the OC block at the OC sublayer. For example, in some aspects, the network node 110 may use the OC block index or other suitable information indicated in the feedback to determine the OC block for which the UE 120 has received at least K symbols (for example, X source symbols and K−X parity symbols), and the network node 110 may then discard any remaining parity symbols associated with the PDU set or the OC block associated with the PDU set at the OC sublayer (for example, without pushing the discarded packets down to lower layers, such as the RLC, MAC, and/or PHY layers). Furthermore, in cases where the feedback from the UE 120 includes an indication to terminate MAC retransmissions, the network node 110 may discard any HARQ retransmission packets that are associated with the OC block at the MAC layer of the network node 110. In this way, the resources utilized to transmit the encoded packets associated with the PDU set may be reduced when the UE 120 has a very high probability of recovering the PDU set or the OC block corresponding to the PDU set, and the freed resources may be allocated to transmit other data and/or communicate with other UEs 120.

In some cases, rather than the UE 120 providing feedback to the network node 110 after receiving at least K symbols associated with the OC block, the network node 110 may count a quantity of ACK messages that are received from the UE 120 to determine how many packets and/or source symbols were successfully delivered to the UE 120. In such cases, after the network node 110 has determined that at least K symbols associated with the OC block were successfully delivered to the UE 120 in accordance with the quantity of ACK messages received from the UE 120, the network node may discard any parity symbols associated with the OC block at the OC sublayer and may discard any HARQ retransmission packets associated with the OC block at the MAC layer. However, relying upon the feedback from the UE 120 may be more accurate than counting the quantity of ACK messages that are received from the UE 120 (for example, because the recovery probability is $$1-\frac{1}{256^{M-K+1}},$$

such that OC techniques may be unable to guarantee a 100% recovery rate). Furthermore, although the network node 110 may estimate whether the UE 120 was able to successfully decode the OC block at the OC sublayer in accordance with the quantity of successfully received symbols for the OC sublayer, estimating whether the UE 120 was able to successfully decode the OC block at the OC sublayer may increase complexity at the network node 110. Accordingly, in addition to reducing the redundancy overhead associated with an OC block or PDU set, using the feedback from the UE 120 to determine when to terminate transmission of parity symbols and/or MAC retransmissions may reduce complexity at the network node 110.

Figure 10:
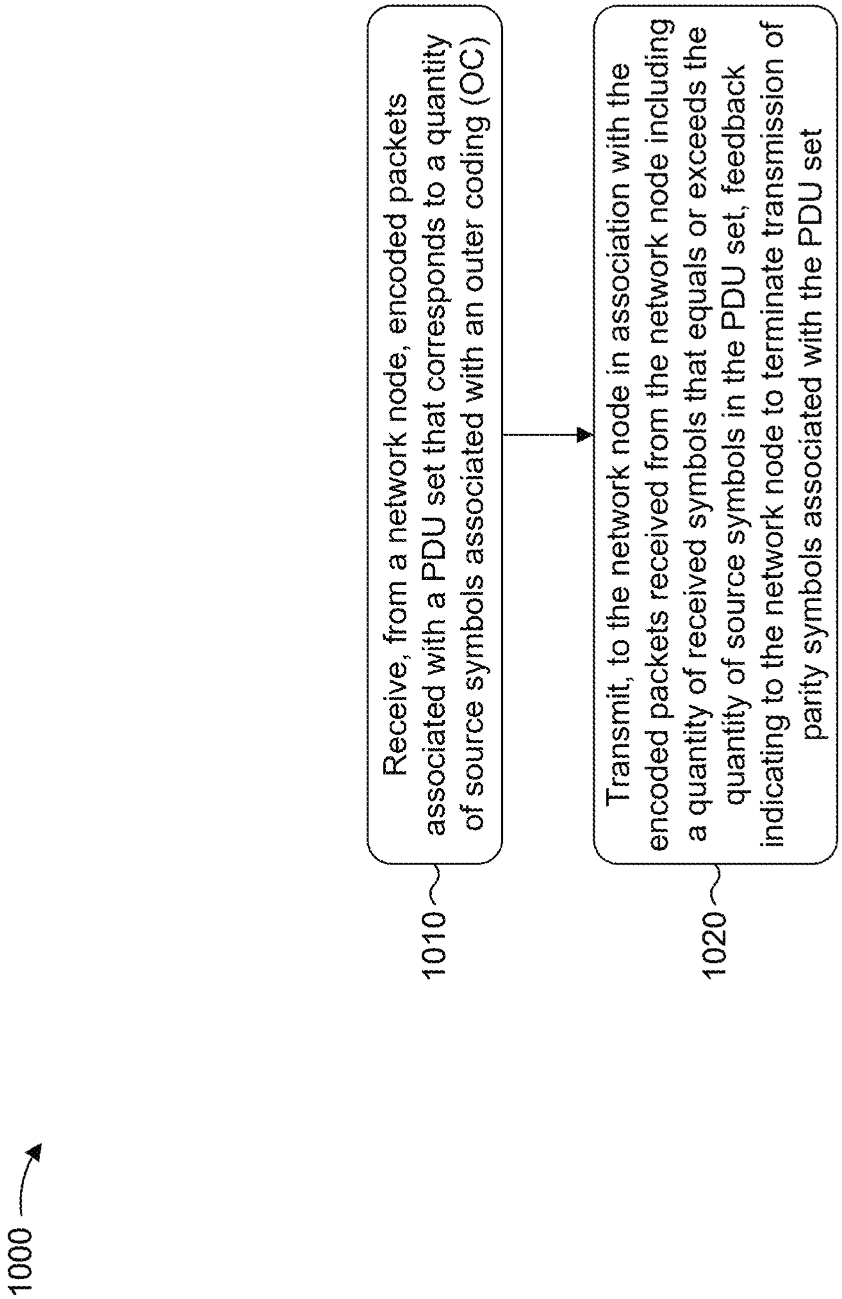
FIG. 10 is a flowchart illustrating an example process performed, for example, by a UE in accordance with the present disclosure.

FIG. 10 is a flowchart illustrating an example process 1000 performed, for example, at a UE or an apparatus of a UE that supports early termination for OC in accordance with the present disclosure. Example process 1000 is an example where the apparatus or the UE (for example, UE 120) performs operations associated with early termination for OC in accordance with UE feedback.

As shown in FIG. 10, in some aspects, process 1000 may include receiving, from a network node, encoded packets associated with a PDU set that corresponds to a quantity of source symbols associated with an OC (block 1010). For example, the UE (such as by using communication manager 1206 or reception component 1202, depicted in FIG. 12) may receive, from a network node, encoded packets associated with a PDU set that corresponds to a quantity of source symbols associated with an OC, as described above.

As further shown in FIG. 10, in some aspects, process 1000 may include transmitting, to the network node in association with the encoded packets received from the network node including a quantity of received symbols that equals or exceeds the quantity of source symbols in the PDU set, feedback indicating to the network node to terminate transmission of parity symbols associated with the PDU set (block 1020). For example, the UE (such as by using communication manager 1206 or transmission component 1204, depicted in FIG. 12) may transmit, to the network node in association with the encoded packets received from the network node including a quantity of received symbols that equals or exceeds the quantity of source symbols in the PDU set, feedback indicating to the network node to terminate transmission of parity symbols associated with the PDU set, as described above.

Process 1000 may include additional aspects, such as any single aspect or any combination of aspects described below or in connection with one or more other processes described elsewhere herein.

In a first additional aspect, the feedback further indicates to the network node to terminate MAC retransmissions associated with the PDU set.

In a second additional aspect, alone or in combination with the first aspect, the feedback includes an OC sublayer status report.

In a third additional aspect, alone or in combination with one or more of the first and second aspects, the OC sublayer status report is carried in UCI.

In a fourth additional aspect, alone or in combination with one or more of the first through third aspects, the OC sublayer status report is carried in a MAC-CE.

In a fifth additional aspect, alone or in combination with one or more of the first through fourth aspects, the feedback includes a one-bit indication that the PDU set has been successfully decoded at an OC sublayer.

In a sixth additional aspect, alone or in combination with one or more of the first through fifth aspects, the feedback indicates an OC block index associated with the PDU set that has been successfully decoded at the OC sublayer.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

Figure 11:
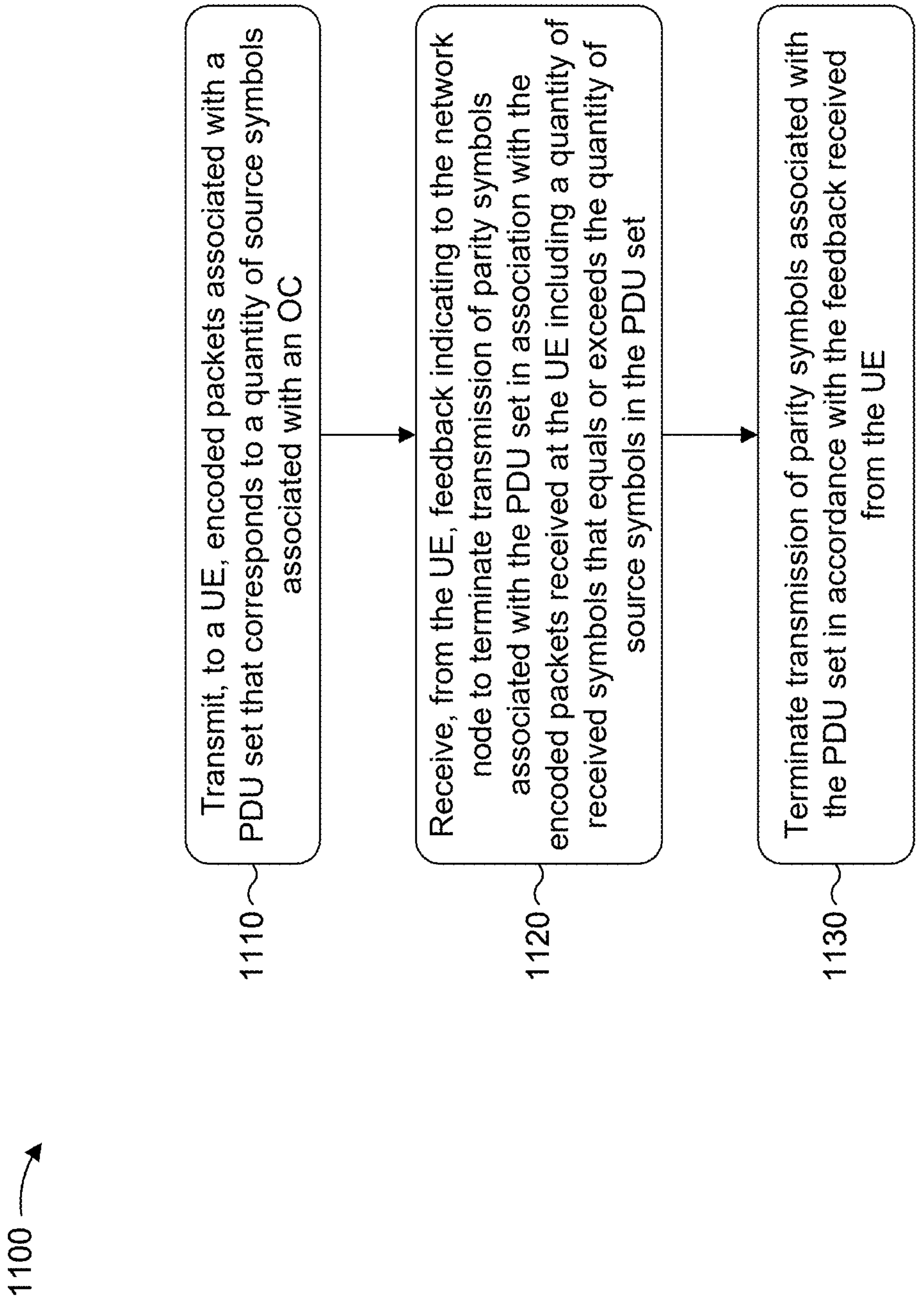
FIG. 11 is a flowchart illustrating an example process performed, for example, by a network node in accordance with the present disclosure.

FIG. 11 is a flowchart illustrating an example process 1100 performed, for example, at a network node or an apparatus of a network node that supports early termination for OC in accordance with the present disclosure. Example process 1100 is an example where the apparatus or the network node (for example, network node 110) performs operations associated with early termination for OC in accordance with UE feedback.

As shown in FIG. 11, in some aspects, process 1100 may include transmitting, to a UE, encoded packets associated with a PDU set that corresponds to a quantity of source symbols associated with an OC (block 1110). For example, the network node (such as by using communication manager 1306 or transmission component 1304, depicted in FIG. 13) may transmit, to a UE, encoded packets associated with a PDU set that corresponds to a quantity of source symbols associated with an OC, as described above.

As further shown in FIG. 11, in some aspects, process 1100 may include receiving, from the UE, feedback indicating to the network node to terminate transmission of parity symbols associated with the PDU set in association with the encoded packets received at the UE including a quantity of received symbols that equals or exceeds the quantity of source symbols in the PDU set (block 1120). For example, the network node (such as by using communication manager 1306 or reception component 1302, depicted in FIG. 13) may receive, from the UE, feedback indicating to the network node to terminate transmission of parity symbols associated with the PDU set in association with the encoded packets received at the UE including a quantity of received symbols that equals or exceeds the quantity of source symbols in the PDU set, as described above.

As further shown in FIG. 11, in some aspects, process 1100 may include terminating transmission of parity symbols associated with the PDU set in accordance with the feedback received from the UE (block 1130). For example, the network node (such as by using communication manager 1306 or termination component 1308, depicted in FIG. 13) may terminate transmission of parity symbols associated with the PDU set in accordance with the feedback received from the UE, as described above.

Process 1100 may include additional aspects, such as any single aspect or any combination of aspects described below or in connection with one or more other processes described elsewhere herein.

In a first additional aspect, terminating transmission of the parity symbols associated with the PDU set comprises discarding packets that include parity symbols associated with the PDU set at an OC sublayer.

In a second additional aspect, alone or in combination with the first aspect, the feedback further indicates to the network node to terminate MAC retransmissions associated with the PDU set.

In a third additional aspect, alone or in combination with one or more of the first and second aspects, process 1100 includes terminating MAC retransmissions associated with the PDU set in accordance with the feedback received from the UE.

In a fourth additional aspect, alone or in combination with one or more of the first through third aspects, terminating the MAC retransmissions associated with the PDU set comprises discarding packets that include HARQ retransmissions associated with the PDU set at a MAC layer.

In a fifth additional aspect, alone or in combination with one or more of the first through fourth aspects, the feedback includes an OC sublayer status report.

In a sixth additional aspect, alone or in combination with one or more of the first through fifth aspects, the OC sublayer status report is carried in UCI.

In a seventh additional aspect, alone or in combination with one or more of the first through sixth aspects, the OC sublayer status report is carried in a MAC-CE.

In an eighth additional aspect, alone or in combination with one or more of the first through seventh aspects, the feedback includes a one-bit indication that the UE successfully decoded the PDU set at an OC sublayer.

In a ninth additional aspect, alone or in combination with one or more of the first through eighth aspects, the feedback indicates an OC block index associated with the PDU set that the UE successfully decoded at the OC sublayer.

Although FIG. 11 shows example blocks of process 1100, in some aspects, process 1100 may include additional blocks, fewer blocks, different blocks, or differently arranged blocks than those depicted in FIG. 11. Additionally or alternatively, two or more of the blocks of process 1100 may be performed in parallel.

Figure 12:
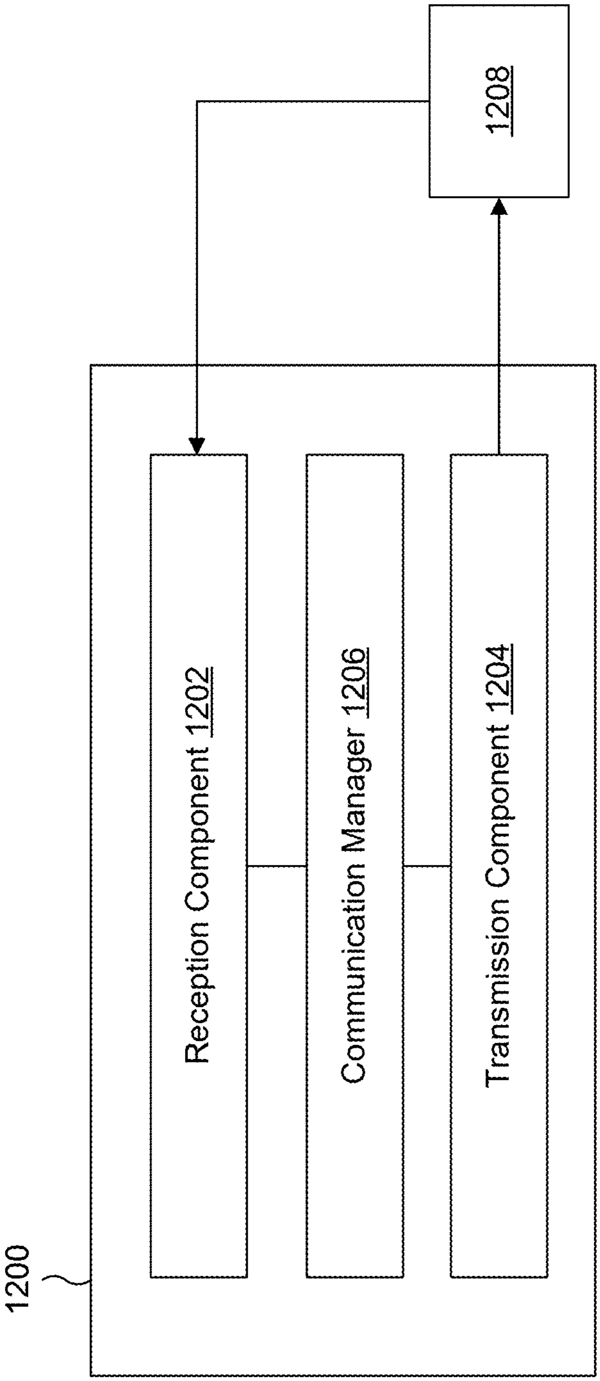
FIGS. 12-13 are diagrams of example apparatuses for wireless communication in accordance with the present disclosure.

FIG. 12 is a diagram of an example apparatus 1200 for wireless communication that supports early termination for OC in accordance with the present disclosure. The apparatus 1200 may be a UE, or a UE may include the apparatus 1200. In some aspects, the apparatus 1200 includes a reception component 1202, a transmission component 1204, and a communication manager 1206, which may be in communication with one another (for example, via one or more buses). As shown, the apparatus 1200 may communicate with another apparatus 1208 (such as a UE, a network node, or another wireless communication device) using the reception component 1202 and the transmission component 1204.

In some aspects, the apparatus 1200 may be configured to and/or operable to perform one or more operations described herein in connection with FIGS. 4, 5, 6, 7, 8, and/or 9. Additionally or alternatively, the apparatus 1200 may be configured to and/or operable to perform one or more processes described herein, such as process 1000 of FIG. 10. In some aspects, the apparatus 1200 may include one or more components of the UE described above in connection with FIG. 2.

The reception component 1202 may receive communications, such as reference signals, control information, and/or data communications, from the apparatus 1208. The reception component 1202 may provide received communications to one or more other components of the apparatus 1200, such as the communication manager 1206. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, one or more modems, one or more demodulators, one or more MIMO detectors, one or more receive processors, one or more controllers/processors, and/or one or more memories of the UE described above in connection with FIG. 2.

The transmission component 1204 may transmit communications, such as reference signals, control information, and/or data communications, to the apparatus 1208. In some aspects, the communication manager 1206 may generate communications and may transmit the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, one or more modems, one or more modulators, one or more transmit MIMO processors, one or more transmit processors, one or more controllers/processors, and/or one or more memories of the UE described above in connection with FIG. 2. In some aspects, the transmission component 1204 may be co-located with the reception component 1202 in one or more transceivers.

The communication manager 1206 may receive or may cause the reception component 1202 to receive, from a network node, encoded packets associated with a PDU set that corresponds to a quantity of source symbols associated with an OC. The communication manager 1206 may transmit, or may cause the transmission component 1204 to transmit, to the network node in association with the encoded packets received from the network node including a quantity of received symbols that equals or exceeds the quantity of source symbols in the PDU set, feedback indicating to the network node to terminate transmission of parity symbols associated with the PDU set. In some aspects, the communication manager 1206 may perform one or more operations described elsewhere herein as being performed by one or more components of the communication manager 1206.

The communication manager 1206 may include one or more controllers/processors and/or one or more memories of the UE described above in connection with FIG. 2. In some aspects, the communication manager 1206 includes a set of components. Alternatively, the set of components may be separate and distinct from the communication manager 1206. In some aspects, one or more components of the set of components may include or may be implemented within one or more controllers/processors and/or one or more memories of the UE described above in connection with FIG. 2. Additionally or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1202 may receive, from a network node, encoded packets associated with a PDU set that corresponds to a quantity of source symbols associated with an OC. The transmission component 1204 may transmit, to the network node, feedback indicating to the network node to terminate transmission of parity symbols associated with the PDU set in association with the encoded packets received at the UE including a quantity of received symbols that equals or exceeds the quantity of source symbols in the PDU set.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
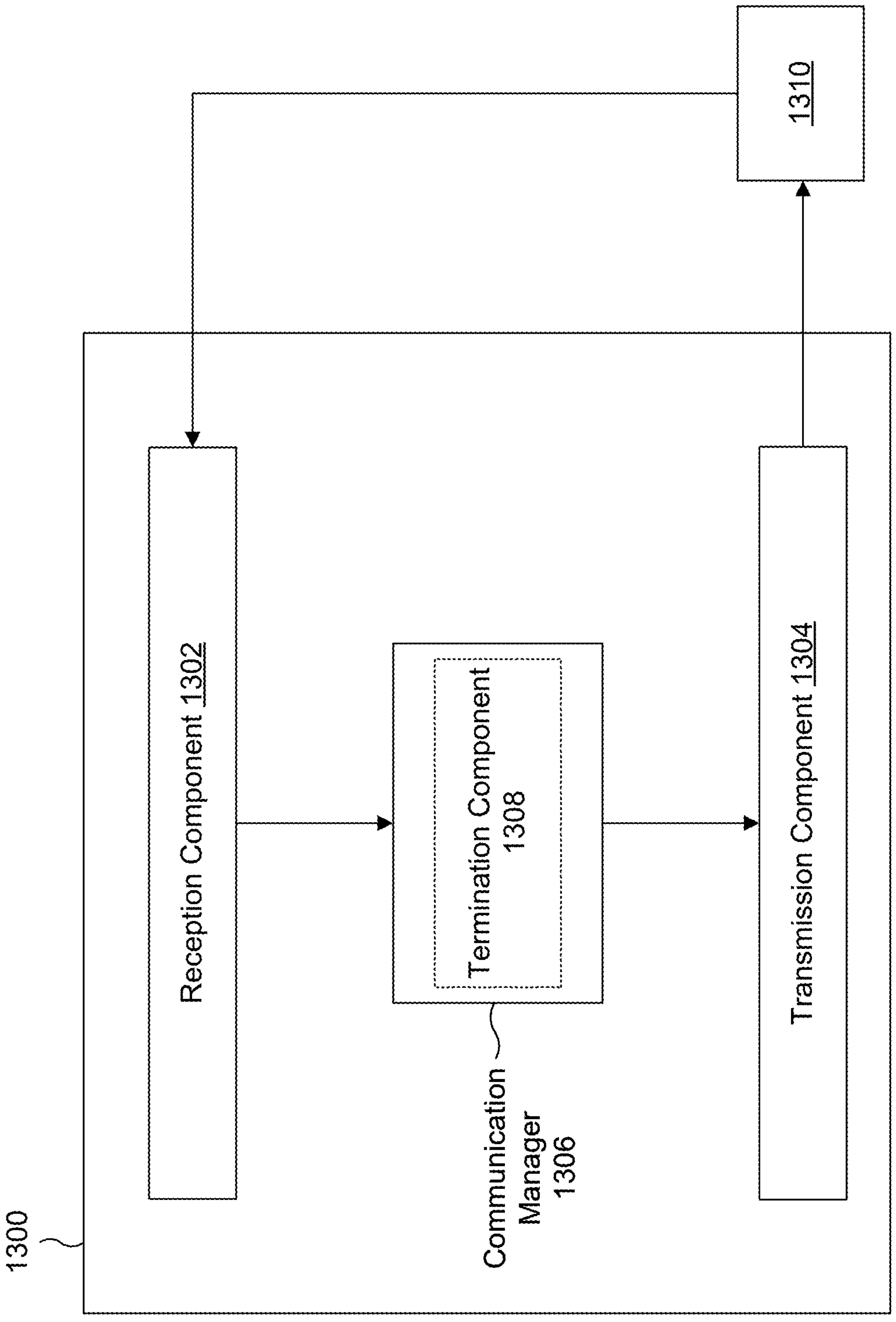

FIG. 13 is a diagram of an example apparatus 1300 for wireless communication that supports early termination for OC in accordance with the present disclosure. The apparatus 1300 may be a network node, or a network node may include the apparatus 1300. In some aspects, the apparatus 1300 includes a reception component 1302, a transmission component 1304, and a communication manager 1306, which may be in communication with one another (for example, via one or more buses). As shown, the apparatus 1300 may communicate with another apparatus 1310 (such as a UE, a network node, or another wireless communication device) using the reception component 1302 and the transmission component 1304.

In some aspects, the apparatus 1300 may be configured to and/or operable to perform one or more operations described herein in connection with FIGS. 4, 5, 6, 7, 8, and/or 9. Additionally or alternatively, the apparatus 1300 may be configured to and/or operable to perform one or more processes described herein, such as process 1100 of FIG. 11. In some aspects, the apparatus 1300 may include one or more components of the network node described above in connection with FIG. 2.

The reception component 1302 may receive communications, such as reference signals, control information, and/or data communications, from the apparatus 1310. The reception component 1302 may provide received communications to one or more other components of the apparatus 1300, such as the communication manager 1306. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1302 may include one or more antennas, one or more modems, one or more demodulators, one or more MIMO detectors, one or more receive processors, one or more controllers/processors, and/or one or more memories of the network node described above in connection with FIG. 2.

The transmission component 1304 may transmit communications, such as reference signals, control information, and/or data communications, to the apparatus 1310. In some aspects, the communication manager 1306 may generate communications and may transmit the generated communications to the transmission component 1304 for transmission to the apparatus 1310. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1310. In some aspects, the transmission component 1304 may include one or more antennas, one or more modems, one or more modulators, one or more transmit MIMO processors, one or more transmit processors, one or more controllers/processors, and/or one or more memories of the network node described above in connection with FIG. 2. In some aspects, the transmission component 1304 may be co-located with the reception component 1302 in one or more transceivers.

The communication manager 1306 may transmit or may cause the transmission component 1304 to transmit, to a UE, encoded packets associated with a PDU set that corresponds to a quantity of source symbols associated with an OC. The communication manager 1306 may receive, or may cause the reception component 1302 to receive, from the UE, feedback indicating to the network node to terminate transmission of parity symbols associated with the PDU set in association with the encoded packets received at the UE including a quantity of received symbols that equals or exceeds the quantity of source symbols in the PDU set. The communication manager 1306 may terminate transmission of parity symbols associated with the PDU set in accordance with the feedback received from the UE. In some aspects, the communication manager 1306 may perform one or more operations described elsewhere herein as being performed by one or more components of the communication manager 1306.

The communication manager 1306 may include one or more controllers/processors, one or more memories, one or more schedulers, and/or one or more communication units of the network node described above in connection with FIG. 2. In some aspects, the communication manager 1306 includes a set of components, such as a termination component 1308. Alternatively, the set of components may be separate and distinct from the communication manager 1306. In some aspects, one or more components of the set of components may include or may be implemented within one or more controllers/processors, one or more memories, one or more schedulers, and/or one or more communication units of the network node described above in connection with FIG. 2. Additionally or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The transmission component 1304 may transmit, to a UE, encoded packets associated with a PDU set that corresponds to a quantity of source symbols associated with an OC. The reception component 1302 may receive, from the UE, feedback indicating to the network node to terminate transmission of parity symbols associated with the PDU set in association with the encoded packets received at the UE including a quantity of received symbols that equals or exceeds the quantity of source symbols in the PDU set. The termination component 1308 may terminate transmission of parity symbols associated with the PDU set in accordance with the feedback received from the UE.

The termination component 1308 may terminate MAC retransmissions associated with the PDU set in accordance with the feedback received from the UE.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

The following provides an overview of some Aspects of the present disclosure:

Aspect 1: A method for wireless communication by a UE, comprising: receiving, from a network node, encoded packets associated with a PDU set that corresponds to a quantity of source symbols associated with an OC; and transmitting, to the network node in association with the encoded packets received from the network node including a quantity of received symbols that equals or exceeds the quantity of source symbols in the PDU set, feedback indicating to the network node to terminate transmission of parity symbols associated with the PDU set.

Aspect 2: The method of Aspect 1, wherein the feedback further indicates to the network node to terminate MAC retransmissions associated with the PDU set.

Aspect 3: The method of any of Aspects 1-2, wherein the feedback includes an OC sublayer status report.

Aspect 4: The method of Aspect 3, wherein the OC sublayer status report is carried in UCI.

Aspect 5: The method of Aspect 3, wherein the OC sublayer status report is carried in a MAC-CE.

Aspect 6: The method of any of Aspects 1-5, wherein the feedback includes a one-bit indication that the PDU set has been successfully decoded at an OC sublayer.

Aspect 7: The method of Aspect 6, wherein the feedback indicates an OC block index associated with the PDU set that has been successfully decoded at the OC sublayer.

Aspect 8: A method for wireless communication by a network node, comprising: transmitting, to a UE, encoded packets associated with a PDU set that corresponds to a quantity of source symbols associated with an OC; receiving, from the UE, feedback indicating to the network node to terminate transmission of parity symbols associated with the PDU set in association with the encoded packets received at the UE including a quantity of received symbols that equals or exceeds the quantity of source symbols in the PDU set; and terminating transmission of parity symbols associated with the PDU set in accordance with the feedback received from the UE.

Aspect 9: The method of Aspect 8, wherein terminating transmission of the parity symbols associated with the PDU set comprises: discarding packets that include parity symbols associated with the PDU set at an OC sublayer.

Aspect 10: The method of any of Aspects 8-9, wherein the feedback further indicates to the network node to terminate MAC retransmissions associated with the PDU set.

Aspect 11: The method of Aspect 10, further comprising: terminating MAC retransmissions associated with the PDU set in accordance with the feedback received from the UE.

Aspect 12: The method of Aspect 11, wherein terminating the MAC retransmissions associated with the PDU set comprises: discarding packets that include HARQ retransmissions associated with the PDU set at a MAC layer.

Aspect 13: The method of any of Aspects 8-12, wherein the feedback includes an OC sublayer status report.

Aspect 14: The method of Aspect 13, wherein the OC sublayer status report is carried in UCI.

Aspect 15: The method of Aspect 13, wherein the OC sublayer status report is carried in a MAC-CE.

Aspect 16: The method of any of Aspects 8-15, wherein the feedback includes a one-bit indication that the UE successfully decoded the PDU set at an OC sublayer.

Aspect 17: The method of Aspect 16, wherein the feedback indicates an OC block index associated with the PDU set that the UE successfully decoded at the OC sublayer.

Aspect 18: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-17.

Aspect 19: An apparatus for wireless communication at a device, the apparatus comprising one or more memories and one or more processors coupled to the one or more memories, the one or more processors configured to cause the device to perform the method of one or more of Aspects 1-17.

Aspect 20: An apparatus for wireless communication, the apparatus comprising at least one means for performing the method of one or more of Aspects 1-17.

Aspect 21: A non-transitory computer-readable medium storing code for wireless communication, the code comprising instructions executable by one or more processors to perform the method of one or more of Aspects 1-17.

Aspect 22: A non-transitory computer-readable medium storing a set of instructions for wireless communication, the set of instructions comprising one or more instructions that, when executed by one or more processors of a device, cause the device to perform the method of one or more of Aspects 1-17.

Aspect 23: A device for wireless communication, the device comprising a processing system that includes one or more processors and one or more memories coupled with the one or more processors, the processing system configured to cause the device to perform the method of one or more of Aspects 1-17.

Aspect 24: An apparatus for wireless communication at a device, the apparatus comprising one or more memories and one or more processors coupled to the one or more memories, the one or more processors individually or collectively configured to cause the device to perform the method of one or more of Aspects 1-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. A user equipment (UE) for wireless communication, comprising:

a processing system that includes one or more processors and one or more memories coupled with the one or more processors, the processing system configured to cause the UE to:

receive, from a network node, encoded packets associated with a protocol data unit (PDU) set, wherein the encoded packets are generated from a quantity of source symbols associated with an outer coding (OC) and parity symbols that are generated from the quantity of source symbols; and transmit, to the network node and based on the encoded packets including a quantity of received symbols that equals or exceeds the quantity of source symbols in the PDU set, feedback indicating to the network node to terminate transmission of the parity symbols associated with the PDU set.

2. The UE of claim 1, wherein the feedback further indicates to the network node to terminate medium access control (MAC) retransmissions associated with the PDU set.

3. The UE of claim 1, wherein the feedback includes an OC sublayer status report.

4. The UE of claim 3, wherein the OC sublayer status report is carried in uplink control information (UCI).

5. The UE of claim 3, wherein the OC sublayer status report is carried in a medium access control (MAC) control element (MAC-CE).

6. The UE of claim 1, wherein the feedback includes a one-bit indication that the PDU set has been successfully decoded at an OC sublayer.

7. The UE of claim 6, wherein the feedback indicates an OC block index associated with the PDU set that has been successfully decoded at the OC sublayer.

8. A network node for wireless communication, comprising:

a processing system that includes one or more processors and one or more memories coupled with the one or more processors, the processing system configured to cause the network node to:

transmit, to a user equipment (UE), encoded packets associated with a protocol data unit (PDU) set, wherein the encoded packets are generated from a quantity of source symbols associated with an outer coding (OC) and parity symbols that are generated from the quantity of source symbols;

receive, from the UE and based on the encoded packets including a quantity of received symbols that equals or exceeds the quantity of source symbols in the PDU set, feedback indicating to the network node to terminate transmission of the parity symbols associated with the PDU set; and terminate transmission of the parity symbols associated with the PDU set in accordance with the feedback received from the UE.

9. The network node of claim 8, wherein the processing system, to terminate transmission of the parity symbols associated with the PDU set, is further configured to cause the network node to:

discard packets that include parity symbols associated with the PDU set at an OC sublayer.

10. The network node of claim 8, wherein the feedback further indicates to the network node to terminate medium access control (MAC) retransmissions associated with the PDU set.

11. The network node of claim 10, wherein the processing system is further configured to cause the network node to:

terminate MAC retransmissions associated with the PDU set in accordance with the feedback received from the UE.

12. The network node of claim 11, wherein the processing system, to terminate the MAC retransmissions associated with the PDU set, is further configured to cause the network node to:

discard packets that include hybrid automatic repeat request (HARQ) retransmissions associated with the PDU set at a MAC layer.

13. The network node of claim 8, wherein the feedback includes an OC sublayer status report.

14. The network node of claim 13, wherein the OC sublayer status report is carried in uplink control information (UCI).

15. The network node of claim 13, wherein the OC sublayer status report is carried in a medium access control (MAC) control element (MAC-CE).

16. The network node of claim 8, wherein the feedback includes a one-bit indication that the UE successfully decoded the PDU set at an OC sublayer.

17. The network node of claim 16, wherein the feedback indicates an OC block index associated with the PDU set that the UE successfully decoded at the OC sublayer.

18. A method for wireless communication by a user equipment (UE), comprising:

receiving, from a network node, encoded packets associated with a protocol data unit (PDU) set, wherein the encoded packets are generated from a quantity of source symbols associated with an outer coding (OC) and parity symbols that are generated from the quantity of source symbols; and transmitting, to the network node and based on encoded packets including a quantity of received symbols that equals or exceeds the quantity of source symbols in the PDU set, feedback indicating to the network node to terminate transmission of the parity symbols associated with the PDU set.

19. The method of claim 18, wherein the feedback further indicates to the network node to terminate medium access control (MAC) retransmissions associated with the PDU set.

20. The method of claim 18, wherein the feedback includes an indication that the PDU set has been successfully decoded at an OC sublayer.

* * * * *